United States Patent
Hou

(10) Patent No.: US 10,153,963 B2
(45) Date of Patent: Dec. 11, 2018

(54) METHOD AND DEVICE FOR RAPIDLY SYNCHRONIZING MEDIUM ACCESS CONTROL ADDRESS TABLE, AND STORAGE MEDIUM

(71) Applicant: ZTE CORPORATION, Shenzhen, Guangdong Province (CN)

(72) Inventor: Yanxiang Hou, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 43 days.

(21) Appl. No.: 15/310,362

(22) PCT Filed: Nov. 7, 2014

(86) PCT No.: PCT/CN2014/090626
§ 371 (c)(1),
(2) Date: Nov. 10, 2016

(87) PCT Pub. No.: WO2015/172538
PCT Pub. Date: Nov. 19, 2015

(65) Prior Publication Data
US 2017/0264530 A1    Sep. 14, 2017

(30) Foreign Application Priority Data

May 12, 2014 (CN) .......................... 2014 1 0198434

(51) Int. Cl.
*H04L 12/703* (2013.01)
*H04L 12/757* (2013.01)
(Continued)

(52) U.S. Cl.
CPC ............ *H04L 45/023* (2013.01); *H04L 45/28* (2013.01); *H04L 45/74* (2013.01); *H04L 61/6022* (2013.01)

(58) Field of Classification Search
CPC ....... H04L 45/00; H04L 45/64; H04L 41/044; H04L 69/40
See application file for complete search history.

(56) References Cited

U.S. PATENT DOCUMENTS

2006/0294211 A1* 12/2006 Amato .................... H04L 45/28
709/220
2010/0039932 A1* 2/2010 Wen ....................... H04L 41/044
370/217
(Continued)

FOREIGN PATENT DOCUMENTS

| CN | 101110846 A | 1/2008 |
| CN | 101115017 A | 1/2008 |

(Continued)

OTHER PUBLICATIONS

International Search Report and Written Opinion dated Feb. 27, 2015, for International Patent Application No. PCT/CN2014/090626.

(Continued)

*Primary Examiner* — Raj Jain
(74) *Attorney, Agent, or Firm* — Plumsea Law Group, LLC

(57) ABSTRACT

The present invention provides a method for rapidly synchronizing a medium access control (MAC) address table. The method includes: initializing a forwarding plane and a control plane, and starting a forwarding plane timer when determining that the forwarding plane and the control plane are initialized successfully (101); when determining that a MAC address table synchronization condition is met, the forwarding plane acquiring a memory operation authority (102); acquiring a MAC address table entry to be synchronized, and synchronizing the MAC address table entry to be synchronized to a designated location in a memory area according to changed content of the MAC address table (Continued)

entry to be synchronized (103). The present invention further provides a device for rapidly synchronizing a MAC address table, and a storage medium.

21 Claims, 10 Drawing Sheets

(51) Int. Cl.
*H04L 29/12* (2006.01)
*H04L 12/741* (2013.01)

(56) References Cited

U.S. PATENT DOCUMENTS

| | | | |
|---|---|---|---|
| 2010/0161819 A1* | 6/2010 | Ohara | G06F 3/1221 |
| | | | 709/229 |
| 2011/0271007 A1* | 11/2011 | Wang | H04L 45/306 |
| | | | 709/238 |
| 2017/0264530 A1* | 9/2017 | Hou | H04L 45/023 |

FOREIGN PATENT DOCUMENTS

| | | |
|---|---|---|
| CN | 101729410 A | 6/2010 |
| CN | 101741728 A | 6/2010 |
| WO | 2013/067681 A1 | 5/2013 |
| WO | 2015172538 A1 | 11/2015 |

OTHER PUBLICATIONS

Extended European Search Report dated Apr. 28, 2017 for European Patent Application No. EP14891894.9.

\* cited by examiner

METHOD AND DEVICE FOR RAPIDLY SYNCHRONIZING MEDIUM ACCESS CONTROL ADDRESS TABLE, AND STORAGE MEDIUM

CROSS-REFERENCE TO RELATED APPLICATION(S)

This application is the U.S. National Phase application of PCT application number PCT/CN2014/090626 having a PCT filing date of Nov. 7, 2014, which claims the priority of Chinese patent application 201410198434.7 filed on May 12, 2014, the entire disclosures of which are incorporated herein by reference.

TECHNICAL FIELD

The document relates to data synchronization technologies in the field of Ethernet data communication, and particularly, to a method and a device for rapidly synchronizing a medium access control (MAC) address table, and a storage medium.

BACKGROUND OF RELATED ART

A conventional Ethernet switch is generally composed of a specialized Application Specific Integrated Circuits (ASIC) chip and a central processing unit (CPU) control system which are called a forwarding plane and a control plane respectively.

In the forwarding plane, the ASIC chip can learn by itself a source MAC address of an Ethernet packet and associate the source MAC address with a packet receiving port. This association relationship can generate a MAC address table. When the above MAC address is used as a destination MAC address of the data packet, the ASIC chip can forward the data packet to the associated port according to the previously learned MAC address table entries, thereby achieving accurate forwarding.

In the control plane, the CPU needs to run a large number of Layer 2 and Layer 3 protocols to control forwarding paths of the forwarding plane and to meet specific service requirements. In the process of running the protocols, based on the consideration of security, efficiency, and so on, it needs to search for the associated port of the specified MAC address frequently; when searching for the associated port of the specified MAC address, the learned MAC address table in the ASIC chip can be queried through a specific hardware interface, however, this approach not only has low-searching efficiency, but also preempts physical interface resources with a configuration channel. Therefore, establishing a MAC address software table in a memory is a common solution.

At present, there are two following methods to create the MAC address software table in the memory:

In a first method, after the forwarding plane learns MAC address table entries, it sends the MAC address table entries through a hardware interface to the control plane in a form of a message for the control plane processing. After receiving the message, the control plane creates a MAC address software table entries in the memory.

In a second method, the control plane creates an independent task in an operating system, periodically queries the MAC address table entries in the forwarding plane, and updates the MAC address software table entries in the memory when changes are found.

In the above two methods, the method based on the message has slightly better timeliness. However, when there are a large number of MAC address table entries that need to be notified to the control plane in a short time, there is a risk of losing messages, which will result in that the MAC address software table is not synchronized with the MAC address table in the forwarding plane, thus leading to a series of problems. The method of periodical query has slightly better security, but its timeliness is poor, and this method occupies certain processor resources of the control plane for a long time, thus this method can only be used as a supplement to the method based on the message.

CONTENT OF THE INVENTION

In view of this, embodiments of the present document is expected to provide a method and a device for rapidly synchronizing a MAC address table and a storage medium, to be able to solve the problem of hardware and software synchronization of a large number of MAC address table entries in a short time.

In order to achieve the above object, the technical solution of the embodiments of the present document is realized as follows:

An embodiment of the present document provides a method for rapidly synchronizing a MAC address table, wherein the method comprises:

initializing a forwarding plane and a control plane, and starting a forwarding plane timer when determining that the forwarding plane and the control plane are successfully initialized;

the forwarding plane acquiring a memory operation authority when determining that a MAC address table synchronization condition is satisfied;

acquiring a MAC address table entry to be synchronized, and synchronizing the MAC address table entry to be synchronized into a designated location in a memory area according to changed content of the MAC address table entry to be synchronized.

In the above scheme, said initializing the forwarding plane and the control plane comprises: the control plane sending MAC address software table configuration information to the forwarding plane; the forwarding plane creating a high-priority queue and a low-priority queue according to the configuration information, and initializing the forwarding plane timer, the high-priority queue, the low-priority queue, and a direct memory access controller (DMAC); or, the forwarding plane defining MAC address software table configuration information, creating a high-priority queue and a low-priority queue according to the configuration information, and initializing the forwarding plane timer, the high-priority queue, the low-priority queue and a Direct Memory Access Controller (DMAC), and the control plane reading the MAC address software table configuration information.

In the above scheme, the MAC address software table configuration information comprises:

an address of a memory area M with specified size, a size N of the memory area M, a timing parameter T, a length En of each buffer queue, a size L of each MAC address table entry and a capacity En' of the system MAC address table;

or, an address of a memory area M with specified size, a size N of the memory area M, a timing parameter T, a buffer threshold value Th of each buffer queue, a length En of each buffer queue, a size L of each MAC address table entry, and a capacity En' of the system MAC address table;

wherein, N=L*En, and En=En'.

In the above scheme, the MAC address table synchronization condition comprises: determining that the forwarding plane timer is overtime and the high-priority queue is locked; or determining that the number of MAC address table entries buffered in the high-priority queue is not lower than a buffer threshold value.

In the above scheme, before determining that the MAC address table synchronization condition is satisfied, the method further comprises:

when a MAC address table entry is changed, judging whether the high-priority queue is locked, and when determining that the high-priority queue is locked, adding the changed MAC address table entry into the low-priority queue; when determining that the high-priority queue is not locked, adding the changed MAC address table entry into the high-priority queue.

In the above scheme, said determining that the forwarding plane timer is overtime and the high-priority queue is locked comprises:

determining that the forwarding plane timer is overtime, judging whether there is the MAC address table entry to be synchronized in the high-priority queue, and locking the high-priority queue when determining that there is the MAC address table entry to be synchronized.

In the above scheme, said acquiring the MAC address table entry to be synchronized, and synchronizing the MAC address table entry to be synchronized into the designated location in the memory area according to the changed content of the MAC address table entry to be synchronized comprise:

taking out a MAC address table entry to be processed from the high-priority queue in turn, judging whether it is a newly-added MAC address table entry, and if it is the newly-added MAC address table entry, writing the newly-added MAC address table entry into the designated location in the memory area, and setting the newly-added MAC address table entry as valid; if it is not the newly-added table entry, judging whether it is a MAC address table entry to be updated, and if it is the table entry to be updated, updating a MAC address table entry in the memory corresponding to the MAC address table entry to be updated, and setting the updated MAC address table entry as valid; and if it is not the table entry to be updated, setting the MAC address table entry to be processed as invalid.

In the above scheme, after synchronizing the MAC address table entry to be synchronized into the designated location in the memory area according to the changed content of the MAC address table entry to be synchronized, the method further comprises:

the forwarding plane releasing a control authority to the memory, reversing the priorities of the high-priority queue and the low-priority queue, and restarting the forwarding plane timer.

In the above scheme, the high-priority queue comprises: a high-priority newly-added queue, a high-priority updating queue and a high-priority deleting queue;

the low-priority queue comprises: a low-priority newly-added queue, a low-priority updating queue and a low-priority deleting queue.

In the above scheme, said determining that the number of the MAC address table entries buffered in the high-priority queue is not lower than the buffer threshold value comprises:

acquiring a sum $Cn$ of the number $Na$ of MAC address table entries buffered in the high-priority newly-added queue, the number $Nb$ of MAC address table entries buffered in the high-priority updating queue, and the number $Nc$ of MAC address table entries buffered in the high-priority deleting queue, and comparing the size of $Cn$ with the preset threshold value $Th$, when $Cn<Th$, the threshold value is not reached; otherwise, the threshold value has been reached.

In the above scheme, said judging whether the high-priority queue is locked, adding the changed MAC address table entry into the low-priority queue when determining that the high-priority queue is locked; and adding the changed MAC address table entry into the high-priority queue when determining that the high-priority queue is not locked comprises:

judging whether the high-priority queue is locked, and when determining that the high-priority queue is locked, judging whether the changed MAC address table entry is a newly-added MAC address table entry or not, if it is the newly-added table entry, adding the newly-added MAC address table entry into the low-priority newly-added queue; if it is not the newly-added table entry, judging whether the changed MAC address table entry is a MAC address table entry to be updated or not, if it is the table entry to be updated, adding the MAC address table entry to be updated into the low-priority updating queue; and if it is not the table entry to be updated, adding the changed MAC address table entry into the low-priority deleting queue;

when determining that the high-priority queue is not locked, judging whether the changed MAC address table entry is a newly-added MAC address table entry or not, if it is the newly-added table entry, adding the newly-added MAC address table entry into the high-priority newly-added queue; if it is not the newly-added table entry, judging whether the changed MAC address table entry is a MAC address table entry to be updated or not, if it is the table entry to be updated, adding the MAC address table entry to be updated into the high-priority updating queue; and if it is not the table entry to be updated, adding the changed MAC address table entry into the high-priority deleting queue.

In the above scheme, said acquiring the MAC address table entry to be synchronized, and synchronizing the MAC address table entry to be synchronized into the designated location in the memory area according to the changed content of the MAC address table entry to be synchronized comprises:

judging whether a value of the number $Na$ of the MAC address table entries buffered in the high-priority newly-added queue is 0 or not, if the value of $Na$ is not 0, storing the $Na$ MAC address table entries buffered in the high-priority newly-added queue into the designated location in the memory area in batches; if the value of $Na$ is 0, judging whether a value of the number $Nb$ of the MAC address table entries buffered in the high-priority updating queue is 0 or not, and if the value of $Nb$ is not 0, storing the $Nb$ MAC address table entries to be updated in the high-priority updating queue into the designated location in the memory area in batches; if the value of $Nb$ is 0, judging whether a value of the number $Nc$ of the MAC address table entries buffered in the high-priority deleting queue is 0 or not, and if the value of $Nc$ is not 0, setting the $Nc$ MAC address table entries buffered in the high-priority deleting queue as invalid.

The embodiment of the present document further provides a device for rapidly synchronizing a MAC address table, comprising: a forwarding plane and a control plane, and the forwarding plane comprising a forwarding plane timer; wherein, the forwarding plane is configured to initialize the forwarding plane and the control plane and start the forwarding plane timer when determining that the forwarding plane and the control plane are initialized successfully; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the forwarding plane timer is configured to time and trigger an operation after a timeout at the time of timeout;

the control plane is configured to initialize the forwarding plane and the control plane, and hand the memory operation authority to the forwarding plane when determining that the MAC address table synchronization condition is satisfied.

In the above scheme, the initialization of the forwarding plane and the control plane comprises: the control plane sending MAC address software table configuration information to the forwarding plane; the forwarding plane creating a high-priority queue and a low-priority queue according to the configuration information, and initializing the forwarding plane timer, the high-priority queue, the low-priority queue and a DMAC; or, the forwarding plane defining MAC address software table configuration information, creating a high-priority queue and a low-priority queue, and initializing the forwarding plane timer, the high-priority queue, the low-priority queue, and a direct memory access controller (DMAC), and the control plane reading the MAC address software table configuration information.

In the above scheme, the MAC address table synchronization condition comprises: determining that the forwarding plane timer times out and the high-priority queue is locked; or determining that the number of MAC address table entries buffered in the high-priority queue is not lower than a buffer threshold value.

In the above scheme, the device further comprises: a first memory and a second memory; wherein the first memory is configured to store the high-priority queue;

the second memory is configured to store the low-priority queue.

In the above scheme, the first memory comprises: a first sub-memory, a second sub-memory and a third sub-memory;

the second memory comprises: a fourth sub-memory, a fifth sub-memory and a sixth sub-memory;

wherein, the first sub-memory is configured to store a high-priority newly-added queue;

the second sub-memory is configured to store a high-priority updating queue;

the third sub-memory is configured to store a high-priority deleting queue;

the fourth sub-memory is configured to store a low-priority newly-added queue;

the fifth sub-memory is configured to store a low-priority updating queue;

the sixth sub memory is configured to store a low-priority deleting queue.

In the above scheme, the forwarding plane is configured to, when a MAC address table entry is changed, judge whether the high-priority queue is locked, add the changed MAC address table entry into the low-priority queue when determining that the high-priority queue is locked; and add the changed MAC address table entry into the high-priority queue when determining that the high-priority queue is not locked; and release a control authority to the memory, control a priority reversion of the high-priority queue and the low-priority queue, and restart the forwarding plane timer.

In the above scheme, the MAC address software table configuration information comprises:

an address of a memory area M with specified size, a size N of M, a timing parameter T, a length En of each buffer queue, a size L of each MAC address table entry and a capacity En' of the system MAC address table;

or, an address of a memory area M with specified size, a size N of M, a timing parameter T, a buffer threshold value Th of each buffer queue, a length En of each buffer queue, a size L of each MAC address table entry, and a capacity En' of the system MAC address table;

wherein, N=L*En, and En=En'.

In the above scheme, said determining that the forwarding plane timer times out and the high-priority queue is locked comprises:

determining that the forwarding plane timer times out, judging whether there is the MAC address table entry to be synchronized in the high-priority queue, and locking the high-priority queue when determining that there is the MAC address table entry to be synchronized.

In the above scheme, the forwarding plane is configured to: take out a MAC address table entry to be processed from the high-priority queue in turn, judging whether it is a newly-added MAC address table entry, and if it is the newly-added table entry, writing the newly-added MAC address table entry into the designated location in the memory area, and setting the newly-added MAC address table entry as valid; if it is not the newly-added table entry, judging whether it is a MAC address table entry to be updated, and if it is the table entry to be updated, updating a MAC address table entry in the memory corresponding to the MAC address table entry to be updated, and setting the updated MAC address table entry as valid; and if it is not the table entry to be updated, setting the MAC address table entry to be processed as invalid.

In the above scheme, said determining that the number of the MAC address table entries buffered in the high-priority queue is not lower than the buffer threshold value comprises: acquiring a sum Cn of the number Na of MAC address table entries buffered in the high-priority newly-added queue, the number Nb of MAC address table entries buffered in the high-priority updating queue, and the number Nc of MAC address table entries buffered in the high-priority deleting queue, and comparing the size of Cn and the preset threshold value Th, when Cn<Th, the threshold value is not reached; otherwise, the threshold value has been reached.

In the above scheme, the forwarding plane is configured to: judge whether the high-priority queue is locked, and when determining that the high-priority queue is locked, judge whether the changed MAC address table entry is a newly-added MAC address table entry or not, if it is the newly-added table entry, add the newly-added MAC address table entry into the low-priority newly-added queue; if it is not the newly-added table entry, judge whether the changed MAC address table entry is a MAC address table entry to be updated or not, if it is the table entry to be updated, add the MAC address table entry to be updated into the low-priority updating queue; and if it is not the table entry to be updated, add the changed MAC address table entry into the low-priority deleting queue;

when determining that the high-priority queue is not locked, judge whether the changed MAC address table entry is a newly-added MAC address table entry or not, if it is the newly-added table entry, add the newly-added MAC address table entry into the high-priority newly-added queue; if it is not the newly-added table entry, judge whether the changed MAC address table entry is a MAC address table entry to be updated or not, if it is the table entry to be updated, add the MAC address table entry to be updated into the high-priority updating queue; and if it is not the table entry to be updated, add the changed MAC address table entry into the high-priority deleting queue.

In the above scheme, the forwarding plane is configured to: judge whether a value of the number Na of MAC address table entries buffered in the high-priority newly-added queue is 0 or not, and if the value of Na is not 0, store the Na MAC address table entries buffered in the high-priority newly-added queue into the designated location in the memory area in batches; if the value of Na is 0, judge whether a value of the number Nb of the MAC address table entries buffered in the high-priority updating queue is 0 or not, and if the value of Nb is not 0, store the Nb MAC address table entries to be updated in the high-priority updating queue into the designated location in the memory area in batches; if the value of Nb is 0, judge whether a value of the number Nc of MAC address table entries buffered in the high-priority deleting queue is 0 or not, and if the value of Nc is not 0, set the Nc MAC address table entries buffered in the high-priority deleting queue as invalid.

The embodiment of the present document further provides a computer storage medium, wherein, the computer storage medium stores computer programs, and the computer programs are used for executing the above method for rapidly synchronizing a MAC address table of the embodiment of the present document.

With the method, the device and the storage medium for rapidly synchronizing the MAC address table provided in the embodiments of the present document, the forwarding plane timer is started when determining that the forwarding plane and the control plane are initialized successfully; when determining that the MAC address table synchronization condition is satisfied, the forwarding plane acquires the memory operation authority, acquires the MAC address table entry to be synchronized, and synchronizes the MAC address table entry to be synchronized into the designated location in the memory area according to the changed content of the MAC address table entry to be synchronized. Since operations such as synchronizing the MAC addresses and so on are implemented by the forwarding plane in the embodiments of the present document, no operation of the control plane is required; moreover, the forwarding plane synchronizes the changed MAC addresses to the designated locations of the memory area. Therefore, in the embodiments of the present document, under the premise of not adding system consumption of the control plane, the control plane, if necessary, is enabled to rapidly index the associated port information of the designated MAC address, so as to achieve the purpose that the forwarding plane and the control plane are synchronized and the data packets are sent accurately.

PREFERRED EMBODIMENTS OF THE PRESENT INVENTION

In an embodiment of the present document, when initialization of a forwarding plane and a control plane is determined to be successful, a forwarding plane timer is started; when a MAC address table synchronization condition is satisfied, the forwarding plane acquires a memory operation authority; and acquires a MAC address table entry to be synchronized, and synchronizes the MAC address table entry to be synchronized into a designated location in a memory area according to changed content of the MAC address table entry to be synchronized.

Herein, changes on the MAC address table entry to be synchronized refers to: a new MAC address table entry learned by the forwarding plane, a MAC address table entry that has been aged or drifted, or a MAC address table entry that needs to be newly added or deleted which is notified by the control plane and received by the forwarding plane.

Wherein, the forwarding plane comprises: a forwarding plane timer, a high-priority queue, a low-priority queue and a DMAC;

the MAC address table synchronization condition comprises: determining that the forwarding plane timer times out and the high-priority queue is locked; or determining that the number of MAC address table entries buffered in the high-priority queue is not lower than a buffer threshold value.

Figure 1:
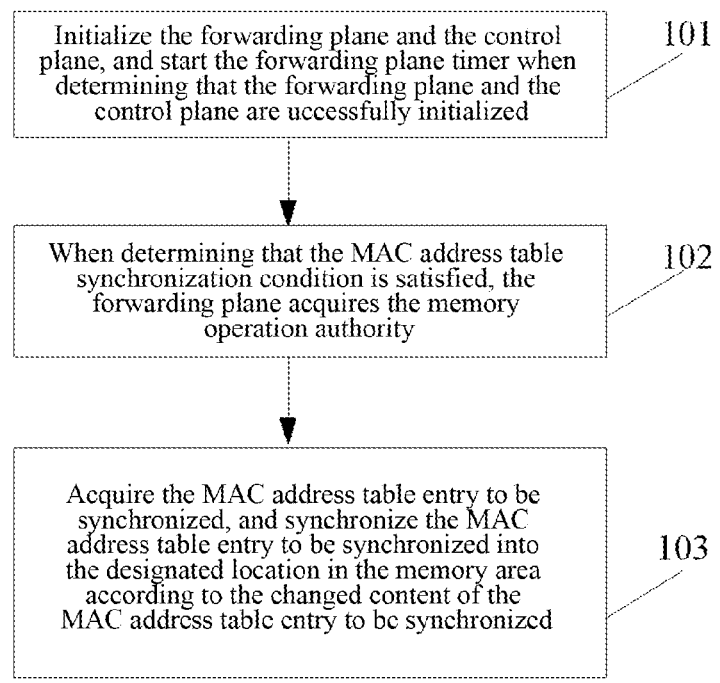
FIG. 1 is a flow chart of a method for rapidly synchronizing a MAC address table in accordance with a first embodiment of the present document.

FIG. 1 is a flow chart of a method for rapidly synchronizing a MAC address table in accordance with a first embodiment of the present document. As shown in FIG. 1, the flow of the method for rapidly synchronizing the MAC address table comprises:

In step 101: the forwarding plane and the control plane are initialized, and the forwarding plane timer is start when determining that the forwarding plane and the control plane are successfully initialized.

Herein, the initializing the forwarding plane and the control plane comprises: the control plane sends MAC address software table configuration information to the forwarding plane, and the forwarding plane initializes the forwarding plane timer, the high-priority queue, the low-priority queue and the DMAC according to the received configuration information; or, the forwarding plane defines the MAC address software table configuration information, creates the high-priority queue and the low-priority queue, and initializes the forwarding plane timer, the high-priority queue, the low-priority queue and the direct memory access controller (DMAC); and the control plane reads the MAC address software table configuration information.

Wherein, the MAC address software table configuration information comprises: an address of a memory area M with specified size, a size N of the memory area M, a timing parameter T, a length En of each buffer queue, a size L of each MAC address table entry and a capacity En' of the system MAC address table, etc.; and other additional function information can be determined by negotiating between the control plane and the forwarding plane; herein, the length of each buffer queue should be consistent with the capacity of the system MAC address table;

or, the MAC address software table configuration information may further comprise: an address of a memory area M with specified size, a size N of M, a timing parameter T, a buffer threshold value Th of each buffer queue, a length En of each buffer queue, a size L of each MAC address table entry, and a capacity En' of the system MAC address table; herein, the buffer threshold value Th of each buffer queue is in a range of 0 to En and is determined by a person skilled in the art based on a CPU processing capability and a network environment; herein, the value of N is equal to the product of L and En, and En is equal to En'.

Each MAC address table entry comprises at least: a MAC address, a port number, a Virtual Local Area Network (VLAN) identifier, and a valid/invalid state of the current MAC address table entry.

The buffer queue comprises a high-priority queue Fh and a low-priority queue Fl.

The initialization being successful refers to that the forwarding plane timer, the high-priority queue Fh and the low-priority queue Fl are all ready, and the initialization being failed refers to that the function of rapidly synchronizing the MAC address table is not supported.

Said initializing the forwarding plane time, the high-priority queue, the low-priority queue and the DMAC comprises: the forwarding plane using the timing parameter T to initialize the forwarding plane timer, creating and initializing the high-priority queue Fh and the low-priority queue Fl, and writing data such as N, L and En, etc., into the DMAC.

Herein, if the initialization of the forwarding plane and the control plane is successful, the forwarding plane sends an initialization success message to the control plane, and starts the forwarding plane timer; if the initialization fails, the forwarding plane sends to the control plane a message of not supporting the function of rapidly synchronizing the MAC address table.

In step 102: when determining that the MAC address table synchronization condition is satisfied, the forwarding plane acquires the memory operation authority.

Herein, the MAC address table synchronization condition comprises: determining that the forwarding plane timer times out and the high-priority queue is locked, or determining that the number of MAC address table entries buffered in the high-priority queue is not lower than the buffer threshold value.

Before determining that the MAC address table synchronization condition is satisfied, the method further comprises: when there is a MAC address table entry changed, judging whether the high-priority queue is locked, and adding the changed MAC address table entry into the buffer queue according to a judgment result; wherein, the changed MAC address table entry comprises: a new MAC address table entry learned by the forwarding plane, a MAC address table entry that has been aged or drifted, and a MAC address table entry that needs to be newly added or deleted which is notified by the control plane and received by the forwarding plane.

Said judging whether the high-priority queue is locked and adding the changed MAC address table entry into the buffer queue according to a judgment result comprises: judging whether the high-priority queue is locked; if it is locked, adding the changed MAC address table entry into the low-priority queue; if it is not locked, adding the changed MAC address table entry into the high-priority queue.

Before determining that the MAC address table synchronization condition is satisfied, the method further comprises: regularly scanning the high-priority queue until the high-priority queue is locked.

Herein, said regularly scanning the high-priority queue until the high-priority queue is locked comprises: the forwarding plane timer being in a waiting state until the forwarding plane timer times out, when determining that the forwarding plane timer times out, judging whether the high-priority queue has a MAC address table entry to be synchronized or not, and if yes, locking the high-priority queue, and if no, restarting the forwarding plane timer.

It should be noted that, when there is a MAC address table entry changed, the operation of judging whether the high-priority queue is locked and adding the changed MAC address table entry into the buffer queue according to the judgment result, and the operation of regularly scanning the high-priority queue, have no specific time order and can be carried out at the same time either.

The forwarding plane acquiring the memory operation authority comprises: the forwarding plane sending a memory operation request to the control plane, and the control plane hands over the memory operation authority to the forwarding plane.

Herein, how the forwarding plane acquires the memory operation authority is an existing technology, and will not be repeated here.

In an embodiment, the high-priority queue further comprises subdividing queues: a high-priority newly-added queue, a high-priority updating queue and a high-priority deleting queue;

the low-priority queue further comprises subdividing queues: a low-priority newly-added queue, a low-priority updating queue and a low-priority deleting queue.

Said judging whether the high-priority queue is locked, and adding the changed MAC address table entry into the buffer queue according to the judgment result comprises:

judging whether the high-priority queue is locked, when determining that the high-priority queue is not locked, judging whether the changed MAC address table entry is a newly-added MAC address table entry, and adding the newly-added MAC address table entry into the high-priority newly-added queue when determining that the changed MAC address table entry is the newly-added table entry; when determining that it is not the newly-added table entry, judging whether the changed MAC address table entry is a MAC address table entry to be updated or not, and if there is the MAC address table entry to be updated, adding the MAC address table entry to be updated into the high-priority updating queue; and if there is no MAC address table entry to be updated, adding the changed MAC address table entry into the high-priority deleting queue;

judging whether the changed MAC address table entry is a newly-added MAC address table entry when determining that the high-priority queue is locked, and adding the newly-added MAC address table entry into the low-priority newly-added queue when determining that the changed MAC address table entry is the newly-added table entry; when determining that it is not the newly-added table entry, judging whether the changed MAC address table entry is a MAC address table entry to be updated or not, and if there is the MAC address table entry to be updated, adding the MAC address table entry to be updated into the low-priority updating queue; and if there is no MAC address table entry to be updated, adding the changed MAC address table entry into the low-priority deleting queue.

Said determining that there is a MAC address table entry to be synchronized in the high-priority queue comprises: determining that there is a MAC address table entry to be synchronized in at least one of the high-priority newly-added queue, the high-priority updating queue and the high-priority deleting queue.

Said determining that there is no MAC address table entry to be synchronized in the high-priority queue comprises: determining that there is no MAC address table entry to be synchronized in all the high-priority newly-added queue, the high-priority updating queue and the high-priority deleting queue.

Said determining that the number of MAC address table entries buffered in the high-priority queue is not lower than the buffer threshold value comprises: acquiring a sum Cn of the number Na of the MAC address table entries buffered in the high-priority newly-added queue, the number Nb of the MAC address table entries buffered in the high-priority updating queue, and the number Nc of the MAC address table entries buffered in the high-priority deleting queue, comparing the size of Cn with the preset threshold value Th, and when Cn<Th, the threshold value is not reached; otherwise, the threshold value has been reached.

In step 103: the MAC address table entry to be synchronized is acquired, and the MAC address table entry to be synchronized is synchronized into the designated location in the memory area according to the changed content of the MAC address table entry to be synchronized.

Herein, a HASH insertion algorithm of the MAC address table in the forwarding plane and the MAC address software table in the control plane needs to keep consistent, so that the control plane can index the memory area M according to this HASH algorithm.

Said acquiring the MAC address table entry to be synchronized is that: the MAC address table entry to be synchronized is acquired from the high-priority queue of the forwarding plane;

said acquiring the MAC address table entry to be synchronized from the high-priority queue, and synchronizing the MAC address table entry to be synchronized into the designated location in the memory area according to the changed content of the MAC address table entry to be synchronized, comprising:

taking out a MAC address table entry to be processed from the high-priority queue in turn, judging whether it is a newly-added MAC address table entry, and if it is the newly-added table entry, writing the newly-added MAC address table entry into the designated location in the memory area, and setting the newly-added MAC address table entry as valid; if it is not the newly-added table entry, judging whether it is a MAC address table entry to be updated, and if it is the table entry to be updated, updating a MAC address table entry in the memory corresponding to the MAC address table entry to be updated, and setting the updated MAC address table entry as valid; and if it is not the table entry to be updated, it is a MAC address table entry to be deleted, then setting the MAC address table entry to be deleted as invalid. Herein, said setting the MAC address table entry to be deleted as invalid comprises: reserving its MAC address table entry resources and setting them as invalid; or, deleting its MAC address table entry resources if necessary.

Herein, the procedure of judging whether the MAC address table entry to be processed is a newly-added table entry, a table entry to be updated and a table entry to be deleted and the processing procedure are not limited to the abovementioned order, the order may be adjusted according to an actual situation, and the judging and processing procedures in the embodiment of the present document are only a preferred embodiment.

In one embodiment, after synchronizing the MAC address table entry to be synchronized into the designated location in the memory area, the method further comprises: the forwarding plane releasing a control authority to the memory, reversing the priorities of the high-priority newly-added, updating and deleting queues and the low-priority newly-added, updating and deleting queues, and restarting the forwarding plane timer.

In one embodiment, when the high-priority queue and the low-priority queue respectively comprise the subdividing queues, the forwarding plane takes out the MAC address table entry to be synchronized from the high-priority queue, and synchronizes the MAC address table entry to be synchronized into the designated location in the memory area according to the changed content of the MAC address table entry to be synchronized, comprising:

judging whether a value of the number Na of MAC address table entries buffered in the high-priority newly-added queue is 0, and if the value of Na is not 0, storing the Na MAC address table entries buffered in the high-priority newly-added queue into the designated location in the memory area in batches; if the value of Na is 0, judging whether a value of the number Nb of MAC address table entries buffered in the high-priority updating queue is 0, and if the value of Nb is not 0, storing the Nb MAC address table entries to be updated in the high-priority updating queue into the designated location in the memory area in batches; otherwise, setting the Nc MAC address table entries buffered in the high-priority deleting queue as invalid. Herein, said setting the Nc MAC address table entries buffered in the high-priority deleting queue as invalid comprises: reserving the Nc MAC address table entry resources and setting the Nc MAC address table entries as invalid; or, deleting the MAC address table entry resources if necessary.

Figure 2:
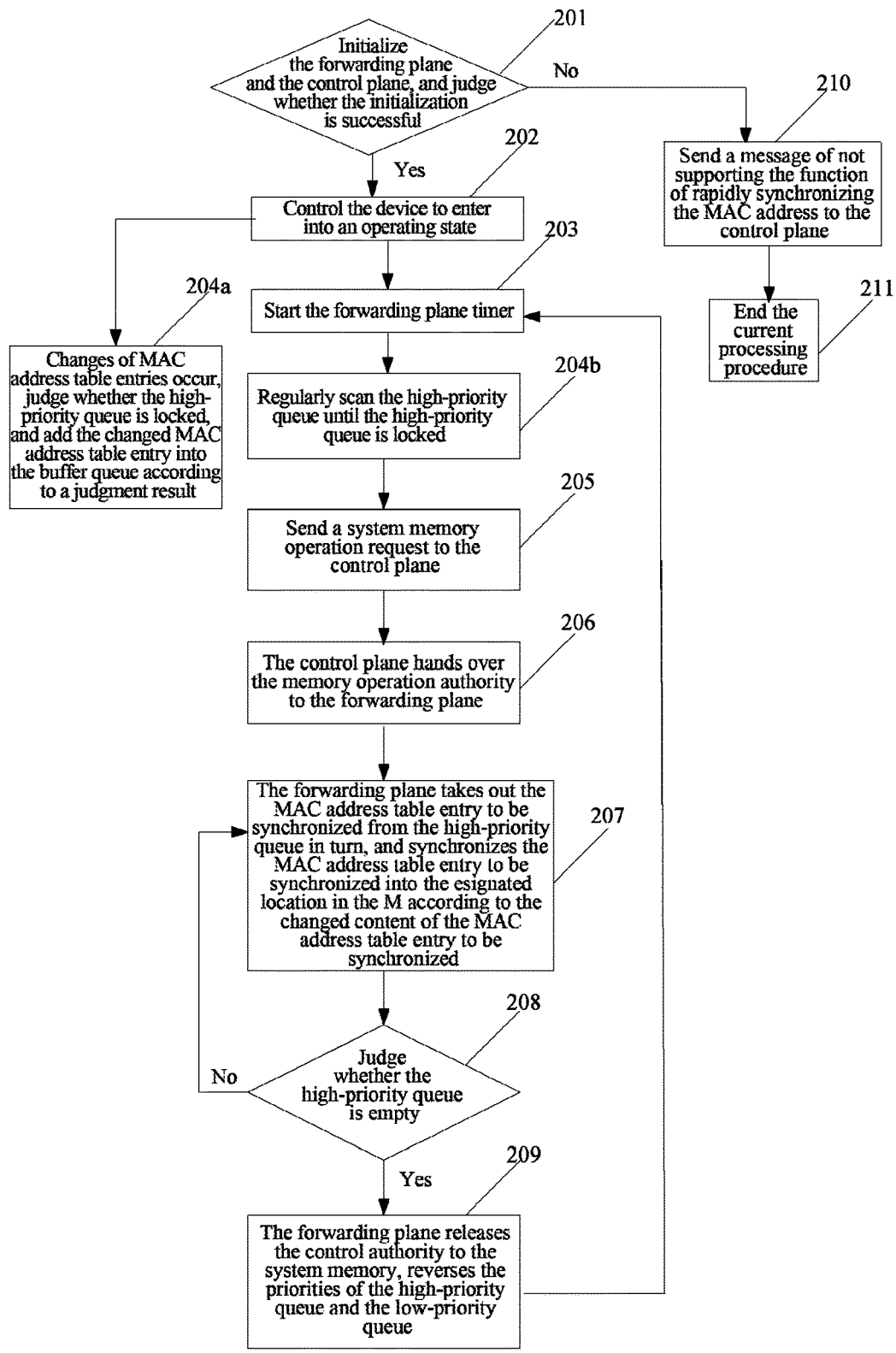
FIG. 2 is a flow chart of the method for rapidly synchronizing a MAC address table in accordance with a second embodiment of the present document.

FIG. 2 is a flow chart of a method for rapidly synchronizing a MAC address table in accordance with a second embodiment of the present document. As shown in FIG. 2, the flow of the method for rapidly synchronizing the MAC address table comprises:

In step 201: the forwarding plane and the control plane are initialized, and it is judged whether the initialization is successful, if yes, it is to proceed to step 202; otherwise, it is to proceed to step 210.

Figure 3:
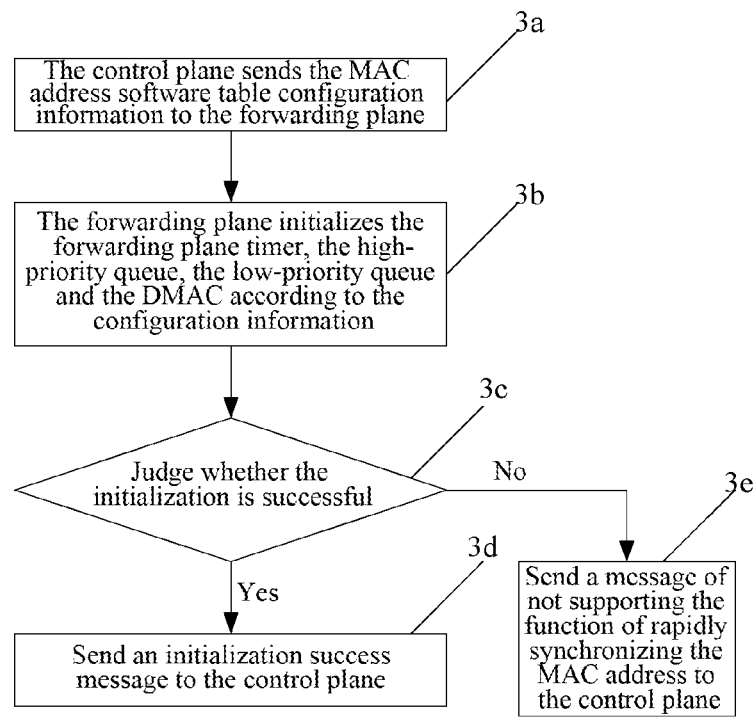
FIG. 3 is a flow chart of a method for initializing a forwarding plane and a control plane in accordance with an embodiment of the present document.

Herein, the flow of the method for initializing the forwarding plane and the control plane is shown in FIG. 3, and comprises:

In step 3a: the control plane sends the MAC address software table configuration information to the forwarding plane.

Herein, the MAC address software table configuration information comprises: the address of the memory area M with specified size, the size N of the M, the timing parameter T, the length En of each buffer queue, the size L of each MAC address table entry, and the capacity En' of the system MAC address table, and other additional function information can be determined by negotiating between the control plane and the forwarding plane; herein, the length of each buffer queue should be consistent with the capacity of the system MAC address table, the value of N is equal to the product of L and En, and En is equal to En'.

Wherein, each MAC address table entry comprises at least: the MAC address, the port number, the VLAN identifier, and the valid/invalid state of the current MAC address table entry.

The buffer queue comprises the high-priority queue Fh and the low-priority queue Fl.

The initialization being successful represents that the forwarding plane timer, the high-priority queue Fh and the low-priority queue Fl have been ready, and the initialization being failed represents that the function of rapidly synchronizing MAC address is not supported.

In step 3b: the forwarding plane initializes the forwarding plane timer, the high-priority queue, the low-priority queue and the DMAC according to the configuration information.

Herein, said initializing the forwarding plane timer, the high-priority queue, the low-priority queue and the DMAC comprises: the forwarding plane using the timing parameter T to initialize the forwarding plane timer, creating and initializing the high-priority queue Fh and the low-priority queue Fl, and writing the data of N, L and En, etc., into the DMAC.

In step 3c: it is judged whether the initialization is successful, and if it is successful, proceed to step 3d; otherwise, proceed to step 3e.

In step 3d: an initialization success message is sent to the control plane, and the current processing procedure ends.

In step 3e: a message of not supporting the function of rapidly synchronizing the MAC address is sent to the control plane.

Said initializing the forwarding plane and the control plane may further comprise: the forwarding plane defining the MAC address software table configuration information, creating the high-priority queue and the low-priority queue, and initializing the forwarding plane timer, the high-priority queue, the low-priority queue and the DMAC; and the control plane reading the MAC address software table configuration information.

In step 202: the device is controlled to enter into an operating state.

In step 203: the forwarding plane timer is started;

Herein, it should be noted that the operations of controlling the device to enter into the operating state and starting the forwarding plane timer are operations executed simultaneously.

In step 204a: changes of MAC address table entries occur, it is judged whether the high-priority queue is locked, changed MAC address table entry is added into the buffer queue according to a judgment result, and the current processing procedure ends.

Herein, the changed MAC address table entry comprise: a new MAC address table entry learned by the forwarding plane, a MAC address table entry that have been aged or drifted, and a MAC address table entry that needs to be added or deleted which is notified by the control plane and received by the forwarding plane.

Said judging whether the high-priority queue is locked and adding the changed MAC address table entry into the buffer queue according to the judgment result comprises: judging whether the high-priority queue is locked, if it is locked, adding the changed MAC address table entry into the low-priority queue; and if it is not locked, adding the changed MAC address table entry into the high-priority queue.

In step 204b: the high-priority queue is regularly scanned until the high-priority queue is locked.

Figure 4:
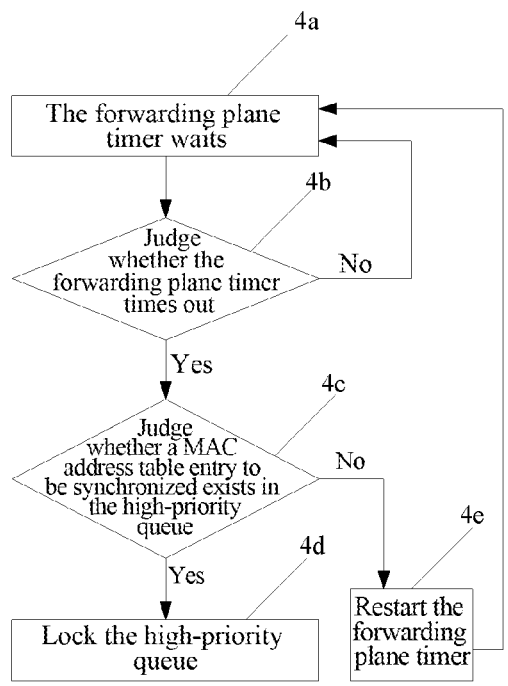
FIG. 4 is a flow chart of a method for regularly scanning a high-priority queue in accordance with an embodiment of the present document.

Herein, the procedure of a method for regularly scanning the high-priority queue until the high-priority queue is locked is shown in FIG. 4 and comprises:

In step 4a: the forwarding plane timer waits.

In step 4b: it is judged whether the forwarding plane timer times out, and if determining that it times out, proceed to step 4c, otherwise, proceed to step 4a.

In step 4c: it is judged whether a MAC address table entry to be synchronized exists in the high-priority queue, and if determining that it exists, proceed to step 4d; if determining that it does not exist, proceed to step 4e.

In step 4d: the high-priority queue is locked, and the current processing procedure ends.

In step 4e: the forwarding plane timer is restarted, and then step 4a is executed.

Herein, it should be noted that the operations of steps 204a and 204b do not have a specific order and can be executed at the same time.

In step 205: a memory operation request is sent to the control plane.

In step 206: the control plane hands over the memory operation authority to the forwarding plane.

Herein, the operation of how the forwarding plane acquires the memory operation authority is the existing technology, and will not be repeated herein.

In step 207: the forwarding plane takes out the MAC address table entry to be synchronized from the high-priority queue in turn, and synchronizes the MAC address table entry to be synchronized into the designated location in the memory area according to the changed content of the MAC address table entry to be synchronized.

Herein, the HASH insertion algorithm of the MAC address table in the forwarding plane and the MAC address software table in the control plane needs to be consistent, so that the control plane can index the M memory area according to this HASH algorithm.

Figure 5:
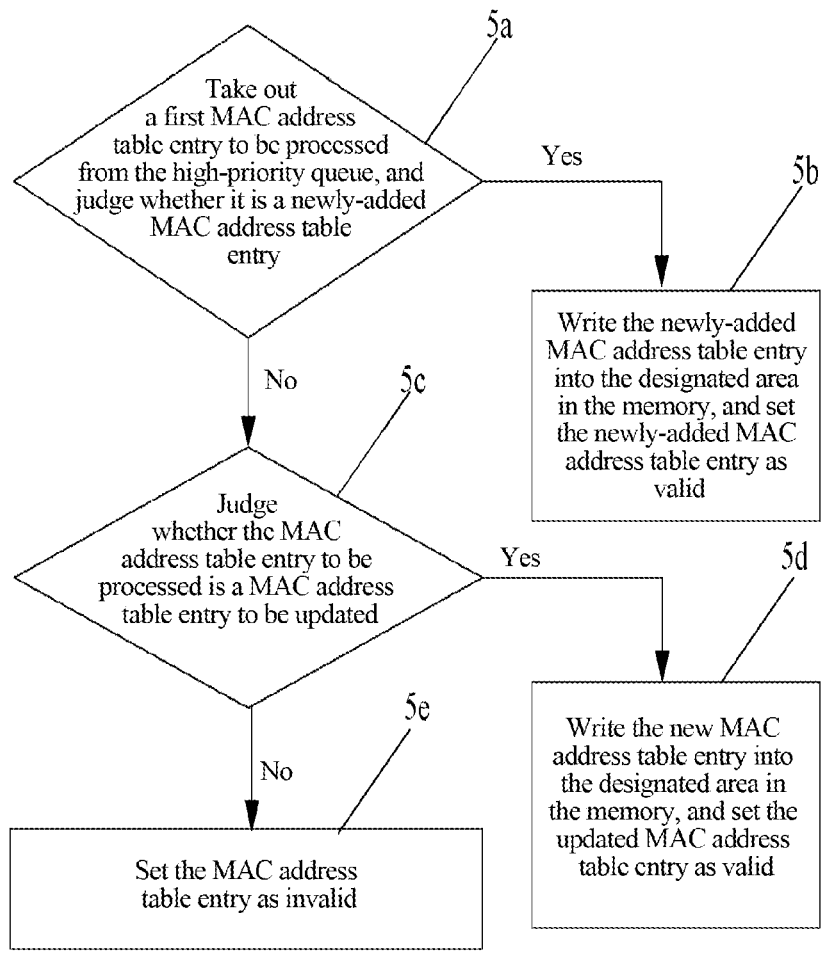
FIG. 5 is a flow chart of a method for synchronizing a changed MAC address table entry in accordance with an embodiment of the present document.

The flow of the method for the forwarding plane taking out the MAC address table entry to be synchronized from the high-priority queue in turn and synchronizing the MAC address table entry to be synchronized into the designated location in the memory area according to the changed content of the MAC address table entry to be synchronized, is shown in FIG. 5, and comprises:

In step 5a: a first MAC address table entry to be processed is taken out from the high-priority queue, and it is judged whether the first MAC address table entry to be processed is a newly-added MAC address table entry, and if it is the newly-added table entry, proceed to step 5b; otherwise, proceed to step 5c.

In step 5b: the newly-added MAC address table entry is written into the designated area in the memory, the newly-added MAC address table entry is set as valid, and the current processing procedure ends.

In step 5c: it is judged whether the MAC address table entry to be processed is a MAC address table entry to be updated, if it is the table entry to be updated, proceed to step 5d; otherwise, the MAC address table entry is determined as an table entry to be deleted, and proceed to step 5e.

In step 5d: a MAC address table entry in the memory area corresponding to the MAC address table entry to be updated is updated, the updated MAC address table entry is set as valid, and the current processing procedure ends.

In step 5e: the MAC address table entry is set as invalid; this step comprises: reserving the MAC address table entry resource and setting the MAC address table entry as invalid; or, deleting the MAC address table entry resource if necessary.

Herein, the procedure of judging whether the MAC address table entry to be synchronized is a newly-added table entry, a table entry to be updated, or a table entry to be deleted and the processing procedure are not limited to the abovementioned order, and may be adjusted according to the actual situation, and the judging and processing order in the embodiment of the present document is only a preferred embodiment.

In step 208: it is judged whether the high-priority queue is empty, and if yes, proceed to step 209; otherwise, proceed to step 207.

In step 209: the forwarding plane releases the control authority to the memory, reverses the priorities of the high-priority queue and the low-priority queue, and step 203 of restarting the forwarding plane timer is executed.

In step 210: the message of not supporting the function of rapidly synchronizing the MAC address is sent to the control plane.

In step 211: the current processing procedure ends.

Figure 6:
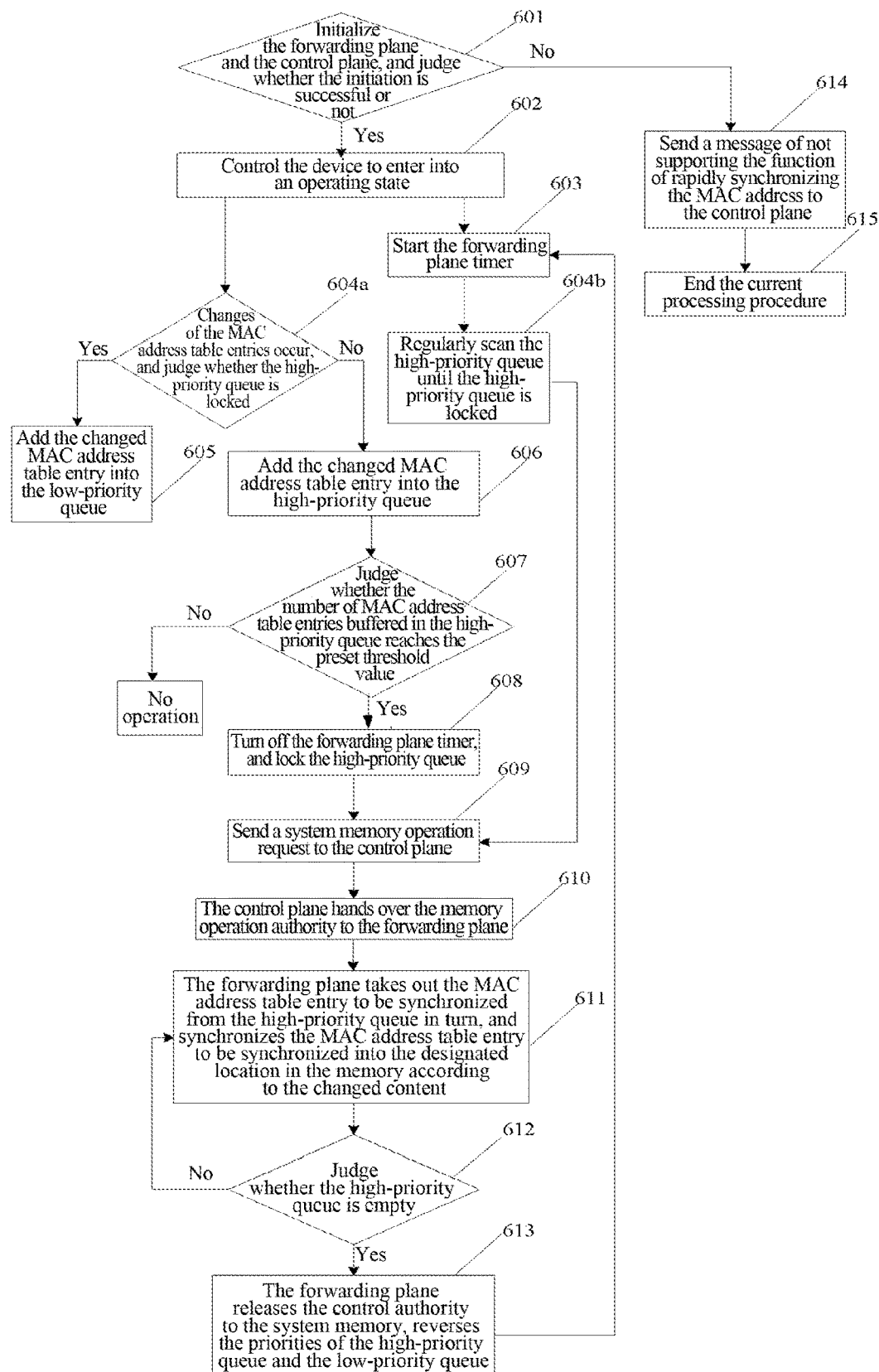
FIG. 6 is a flow chart of the method for rapidly synchronizing a MAC address table in accordance with a third embodiment of the present document.

FIG. 6 is a flow chart of a method for rapidly synchronizing a MAC address table according to a third embodiment of the present document, and as shown in FIG. 6, the method for rapidly synchronizing a MAC address table comprises:

In step 601: the forwarding plane and the control plane are initialized, and it is judged whether the initiation is successful or not, and if it is successful, proceed to step 602; otherwise, proceed to step 614.

Herein, the flow of the method for initializing the forwarding plane and the control plane is shown in FIG. 3, and comprises:

In step 3a: the control plane sends the MAC address software table configuration information to the forwarding plane.

Herein, the MAC address software table configuration information comprises: the address of the memory area M with specified size, the size N of the M, the timing parameter T, the buffer threshold value Th of each buffer queue, the length En of each buffer queue, the size L of each MAC address table entry, and the capacity En' of the system MAC address table, and other additional function information can be determined by negotiating between the control plane and the forwarding plane;

herein, the length of each buffer queue should be consistent with the capacity of the system MAC address table, and the range of the buffer threshold value Th of each buffer queue is 0 to En and is set by a person skilled in the art in terms of the CPU processing capability and the network environment; the value of N is equal to the product of L and En, and En is equal to En'.

Wherein, each MAC address table entry comprises at least: the MAC address, the PORT number, the VLAN identifier, and the valid/invalid state of the current MAC address table entry.

The buffer queue comprises the high-priority queue Fh and the low-priority queue Fl.

The initialization being successful represents that the forwarding plane timer, the high-priority queue Fh and the low-priority queue Fl have been ready, and the initialization being failed represents that the function of rapidly synchronizing MAC address is not supported.

In step 3b: the forwarding plane timer, the high-priority queue, the low-priority queue and the DMAC are initialized;

Herein, said initializing the forwarding plane timer, the high-priority queue, the low-priority queue and the DMAC comprises: the forwarding plane using the timing parameter T to initialize the forwarding plane timer, creating and initializing two FIFO queues, i.e., the high-priority queue Fh and the low-priority queue Fl, and writing data such as N, L, En and Th, etc., into the DMAC.

In step 3c: it is judged whether the initialization is successful, and if it is successful, proceed to step 3d; otherwise, proceed to step 3e.

In step 3d: an initialization success message is sent to the control plane, and the current processing procedure ends.

In step 3e: a message of not supporting the function of rapidly synchronizing the MAC address is sent to the control plane.

Said initializing the forwarding plane and the control plane may further comprise: the forwarding plane defining the MAC address software table configuration information, creating the high-priority queue and the low-priority queue, and initializing the forwarding plane timer, the high-priority queue, the low-priority queue and the DMAC; and the control plane reading the MAC address software table configuration information.

In step 602: the device is controlled to enter into an operating state.

In step 603: the forwarding plane timer is started.

Herein, it should be noted that the operations of controlling the device to enter into the operating state and starting the forwarding plane timer are operations executed simultaneously.

In step 604a: changes of MAC address table entries occur, it is judged whether the high-priority queue is locked, and proceed to step 605 when determining that the high-priority queue is locked; and proceed to step 606 when determining that the high-priority queue is not locked.

Herein, the changed MAC address table entry comprise: a new MAC address table entry learned by the forwarding plane, a MAC address table entry that have been aged or drifted, and a MAC address table entry that needs to be added or deleted which is notified by the control plane and received by the forwarding plane.

In step 604b: the high-priority queue is regularly scanned until the high-priority queue is locked, and proceed to step 609.

Herein, the procedure of a method for regularly scanning the high-priority queue until the high-priority queue is locked is shown in FIG. 4 and comprises:

In step 4a: the forwarding plane timer waits.

In step 4b: it is judged whether the timer times out, and if determining that it times out, proceed to step 4c, otherwise, proceed to step 4a.

In step 4c: it is judged whether a MAC address table entry to be synchronized exists in the high-priority queue, and if determining that it exists, proceed to step 4d; if determining that it does not exist, proceed to step 4e.

In step 4d: the high-priority queue is locked, and the current processing procedure ends.

In step 4e: the forwarding plane timer is restarted, and then step 4a is executed.

Herein, it should be noted that the operations of steps 604a and 604b do not have a specific order and can be executed at the same time.

In step 605: the changed MAC address table entry is added into the low-priority queue, and the current processing procedure ends.

In step 606: the changed MAC address table entry is added into the high-priority queue.

In step 607: it is judged whether the number of MAC address table entries buffered in the high-priority queue reaches the preset threshold value Th, and if it reaches the threshold value, proceed to step 608; otherwise, no operation is executed, and the current processing procedure ends.

In step 608: the forwarding plane timer is turned off, and the high-priority queue is locked.

In step 609: a memory operation request is sent to the control plane.

In step 610: the control plane hands over the memory operation authority to the forwarding plane.

Herein, the operation of the control plane handing over the memory operation authority to the forwarding plane is the existing technology, and will not be repeated here.

In step 611: the forwarding plane takes out the MAC address table entry to be synchronized from the high-priority queue in turn, and synchronizes the MAC address table entry to be synchronized into the designated location in the memory area according to the changed content of the MAC address table entry to be synchronized.

Herein, the HASH insertion algorithm of the MAC address table in the forwarding plane and the MAC address software table in the control plane needs to be consistent, so that the control plane can index the memory area according to this HASH algorithm.

The flow of the method for the forwarding plane taking out the MAC address table entry to be synchronized from the high-priority queue in turn and synchronizing the MAC address table entry to be synchronized into the designated location in the memory area according to the changed content of the MAC address table entry to be synchronized, is shown in FIG. 5, and comprises:

In step 5a: a first MAC address table entry to be processed is taken out from the high-priority queue, and it is judged whether the first MAC address table entry to be processed is a newly-added MAC address table entry, and if it is the newly-added table entry, proceed to step 5b; otherwise, proceed to step 5c.

In step 5b: the newly-added MAC address table entry is written into the designated area in the memory, the newly-added MAC address table entry is set as valid, and the current processing procedure ends.

In step 5c: it is judged whether the MAC address table entry to be processed is a MAC address table entry to be updated, if it is the table entry to be updated, proceed to step 5d; otherwise, proceed to step 5e.

In step 5d: a MAC address table entry in the memory area corresponding to the MAC address table entry to be updated is updated, the updated MAC address table entry is set as valid, and the current processing procedure ends.

In step 5e: the MAC address table entry is set as invalid; this step comprises: reserving the MAC address table entry resource and setting the MAC address table entry as invalid; or, deleting the MAC address table entry resource if necessary.

In step 612: it is judged whether the high-priority queue is empty, and if yes, proceed to step 613; otherwise, proceed to step 611.

In step 613: the forwarding plane releases the control authority to the memory, reverses the priorities of the high-priority queue and the low-priority queue, and step 603 of restarting the forwarding plane timer is executed, and the current processing procedure ends.

In step 614: the message of not supporting the function of rapidly synchronizing the MAC address is sent to the control plane.

In step 615: the current processing procedure ends.

Figure 7:
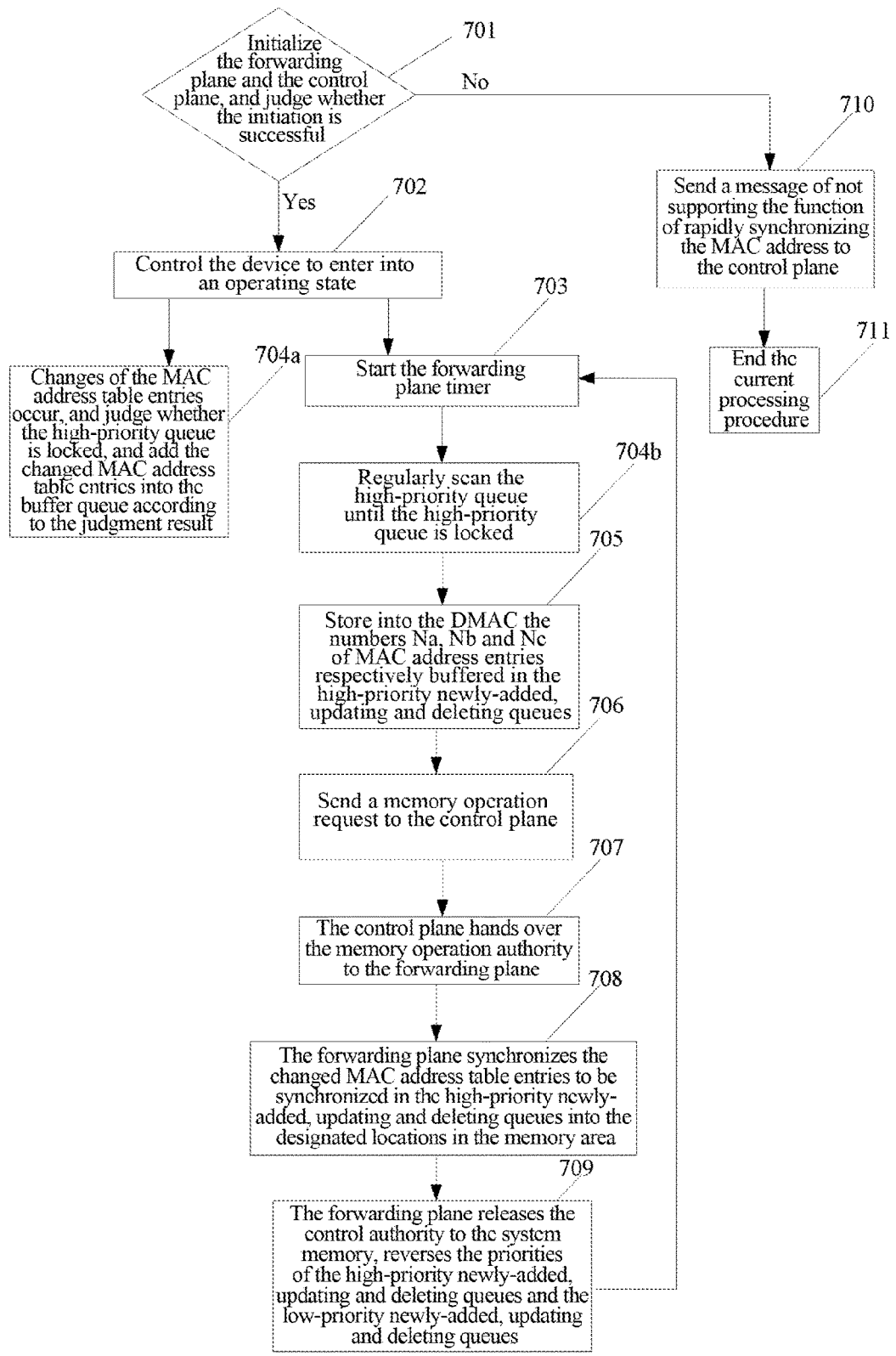
FIG. 7 is a flow chart of the method for rapidly synchronizing a MAC address table in accordance with a fourth embodiment of the present document.

FIG. 7 is a flow chart of a method for rapidly synchronizing a MAC address table according to a fourth embodiment of the present document. As shown in FIG. 7, the method for rapidly synchronizing a MAC address table comprises:

In step 701: the forwarding plane and the control plane are initialized, and it is judged judge whether the initiation is successful or not, and if yes, proceed to step 702; otherwise, proceed to step 710.

Herein, the flow of the method for initializing the forwarding plane and the control plane is shown in FIG. 3, and comprises:

In step 3a: the control plane sends the MAC address software table configuration information to the forwarding plane.

Herein, the MAC address software table configuration information comprises: the address of the memory area M with specified size, the size N of the M, the timing parameter T, the length En of each buffer queue, the size L of each MAC address table entry, and the capacity En' of the system MAC address table, and other additional function information can be determined by negotiating between the control plane and the forwarding plane;

herein, the length of each buffer queue should be consistent with the capacity of the system MAC address table, the value of N is equal to the product of L and En, and En is equal to En'.

Wherein, each MAC address table entry comprises at least: the MAC address, the port number, the VLAN identifier, and the valid/invalid state of the current MAC address table entry.

The buffer queue comprises the high-priority queue Fh and the low-priority queue Fl.

The initialization being successful represents that the forwarding plane timer, the high-priority queue Fh and the low-priority queue Fl have been ready, and the initialization being failed represents that the function of rapidly synchronizing MAC address is not supported.

In step 3b: it is to initialize the forwarding plane timer, the high-priority queue, the low-priority queue and the DMAC;

Herein, said initializing the forwarding plane timer, the high-priority queue, the low-priority queue and the DMAC comprises: the forwarding plane using the timing parameter T to initialize the forwarding plane timer, creating and initializing the high-priority queue Fh and the low-priority queue Fl, and writing the data of N, L and En, etc., into the DMAC.

In step 3c: it is judged whether the initialization is successful, and if it is successful, proceed to step 3d; otherwise, proceed to step 3e.

In step 3d: an initialization success message is sent to the control plane, and the current processing procedure ends.

In step 3e: a message of not supporting the function of rapidly synchronizing the MAC address is sent to the control plane.

Said initializing the forwarding plane and the control plane may further comprise: the forwarding plane defining the MAC address software table configuration information, creating the high-priority queue and the low-priority queue, and initializing the forwarding plane timer, the high-priority queue, the low-priority queue and the DMAC; and the control plane reading the MAC address software table configuration information.

In step 702: the device is controlled to enter into an operating state.

In step 703: the forwarding plane timer is started;

Herein, it should be noted that the operations of controlling the device to enter into the operating state and starting the forwarding plane timer are operations executed simultaneously.

In step 704a: changes of MAC address table entries occur, it is judged whether the high-priority queue is locked, the changed MAC address table entry is added into the buffer queue according to a judgment result.

Herein, the changed MAC address table entry comprise: a new MAC address table entry learned by the forwarding plane, a MAC address table entry that have been aged or drifted, and a MAC address table entry that needs to be added or deleted which is notified by the control plane and received by the forwarding plane.

The high-priority queue comprises subdividing queues: a high-priority newly-added queue, a high-priority updating queue and a high-priority deleting queue;

the low-priority queue comprises subdividing queues: a low-priority newly-added queue, a low-priority updating queue and a low-priority deleting queue.

Figure 8:
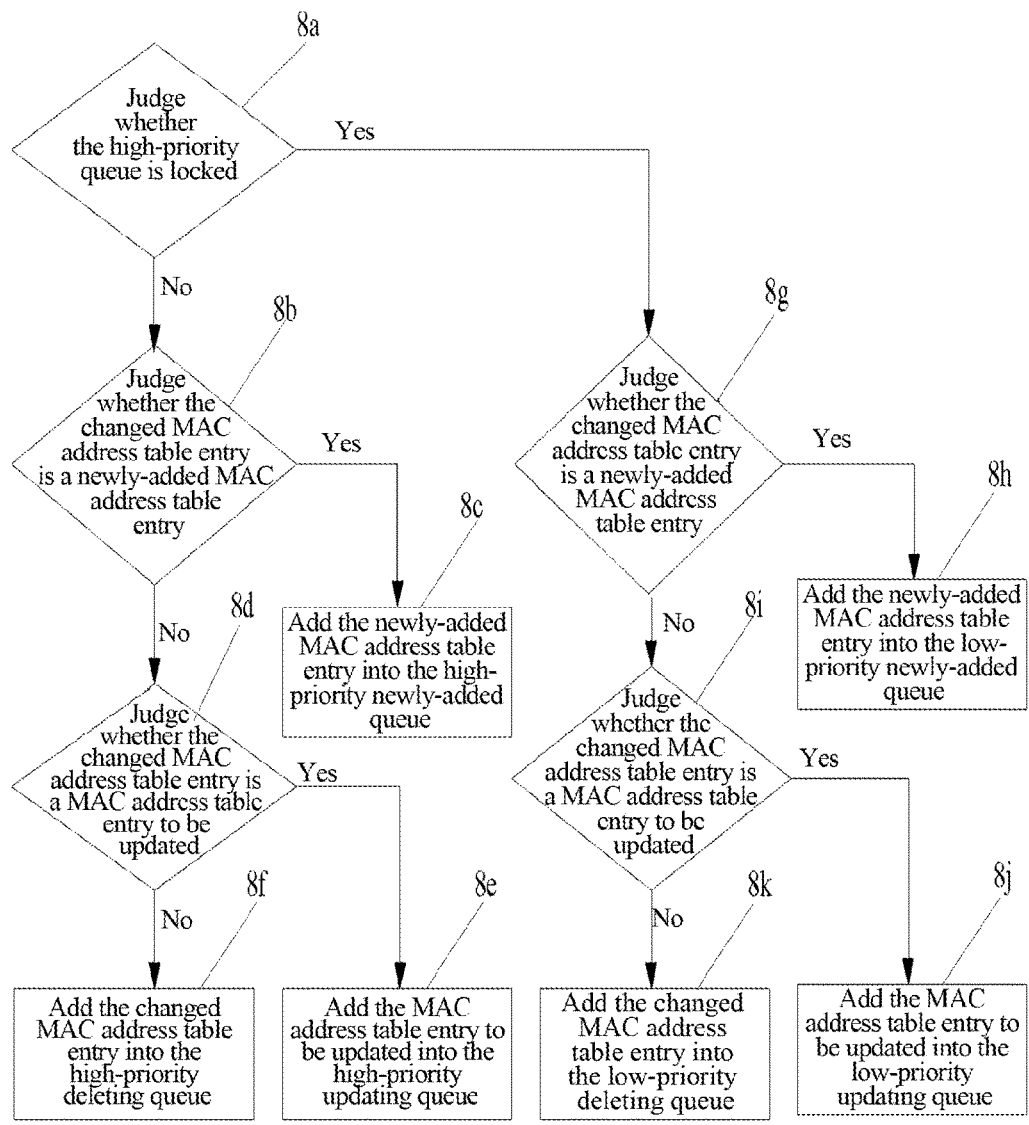
FIG. 8 is a flow chart of a method for a changed MAC address table entry entering into a queue with subdivided queues in accordance with an embodiment of the present document.

A flow of a method for judging whether the high-priority queue is locked and adding the changed MAC address table entry into the buffer queue according to the judgment result is shown in FIG. 8, and comprises:

In step 8a, it is judged whether the high-priority queue is locked, and proceed to step 8b if determining that it is not locked; and proceed to step 8g if determining that it is locked.

In step 8b: it is judged whether a changed MAC address table entry is a newly-added MAC address table entry, and when determining that it is the newly-added table entry, proceed to step 8c; otherwise, proceed to step 8d.

In step 8c: the newly-added MAC address table entry is added into the high-priority newly-added queue.

In step 8d: it is judged whether the changed MAC address table entry is a MAC address table entry to be updated, and if it is the table entry to be updated, proceed to step 8e; otherwise, proceed to step 8f.

In step 8e: the MAC address table entry to be updated is add into the high-priority updating queue, and the current processing procedure ends.

In step 8f: the changed MAC address table entry is add into the high-priority deleting queue, and the current processing procedure ends.

In step 8g: it is judged whether a changed MAC address table entry is a newly-added MAC address table entry, and when determining that it is the newly-added table entry, proceed to step 8h; otherwise, proceed to step 8i.

In step 8h: the newly-added MAC address table entry is added into the low-priority newly-added queue.

In step 8i: it is judged whether the changed MAC address table entry is a MAC address table entry to be updated, and if it is the table entry to be updated, proceed to step 8j; otherwise, proceed to step 8k.

In step 8j: the MAC address table entry to be updated is add into the low-priority updating queue, and the current processing procedure ends.

In step 8k: the changed MAC address table entry is add into the low-priority deleting queue, and the current processing procedure ends.

In step 704b: the high-priority queue is regularly scanned until the high-priority queue is locked, and proceed to step 705.

Herein, the procedure of a method for regularly scanning the high-priority queue until the high-priority queue is locked is shown in FIG. 4 and comprises:

In step 4a: the forwarding plane timer waits.

In step 4b: it is judged whether the forwarding plane timer times out, and if determining that it times out, proceed to step 4c, otherwise, proceed to step 4a.

In step 4c: it is judged whether a MAC address table entry to be synchronized exists in the high-priority queue, and if determining that it exists, proceed to step 4d; if determining that it does not exist, proceed to step 4e.

Herein, said determining that a MAC address table entry to be synchronized exists in the high-priority queue comprises: determining that the MAC address table entry to be synchronized exists in at least one of the high-priority newly-added queue, the high-priority updating queue and the high-priority deleting queue;

said determining that no MAC address table entry to be synchronized exists in the high-priority queue comprises: determining that no MAC address table entry to be synchronized exists in all of the high-priority newly-added queue, the high-priority updating queue and the high-priority deleting queue.

In step 4d: the high-priority queue is locked, and the current processing procedure ends.

In step 4e: the forwarding plane timer is restarted, and then step 4a is executed.

Herein, it should be noted that there are no specific order for the operations of steps 704a and 704b, and they can be executed at the same time.

In step 705: the numbers Na, Nb and Nc of MAC address table entries respectively buffered in the high-priority newly-added, updating and deleting queues are stored into the DMAC.

In step 706: a memory operation request is sent to the control plane.

In step 707: the control plane hands over the memory operation authority to the forwarding plane.

In step 708: the forwarding plane synchronizes the changed MAC address table entries to be synchronized in the high-priority newly-added, updating and deleting queues into the designated locations in the memory area.

Herein, the HASH insertion algorithm of the MAC address table in the forwarding plane and the MAC address software table in the control plane needs to be consistent, so that the control plane can index the M memory area according to this HASH algorithm.

Figure 9:
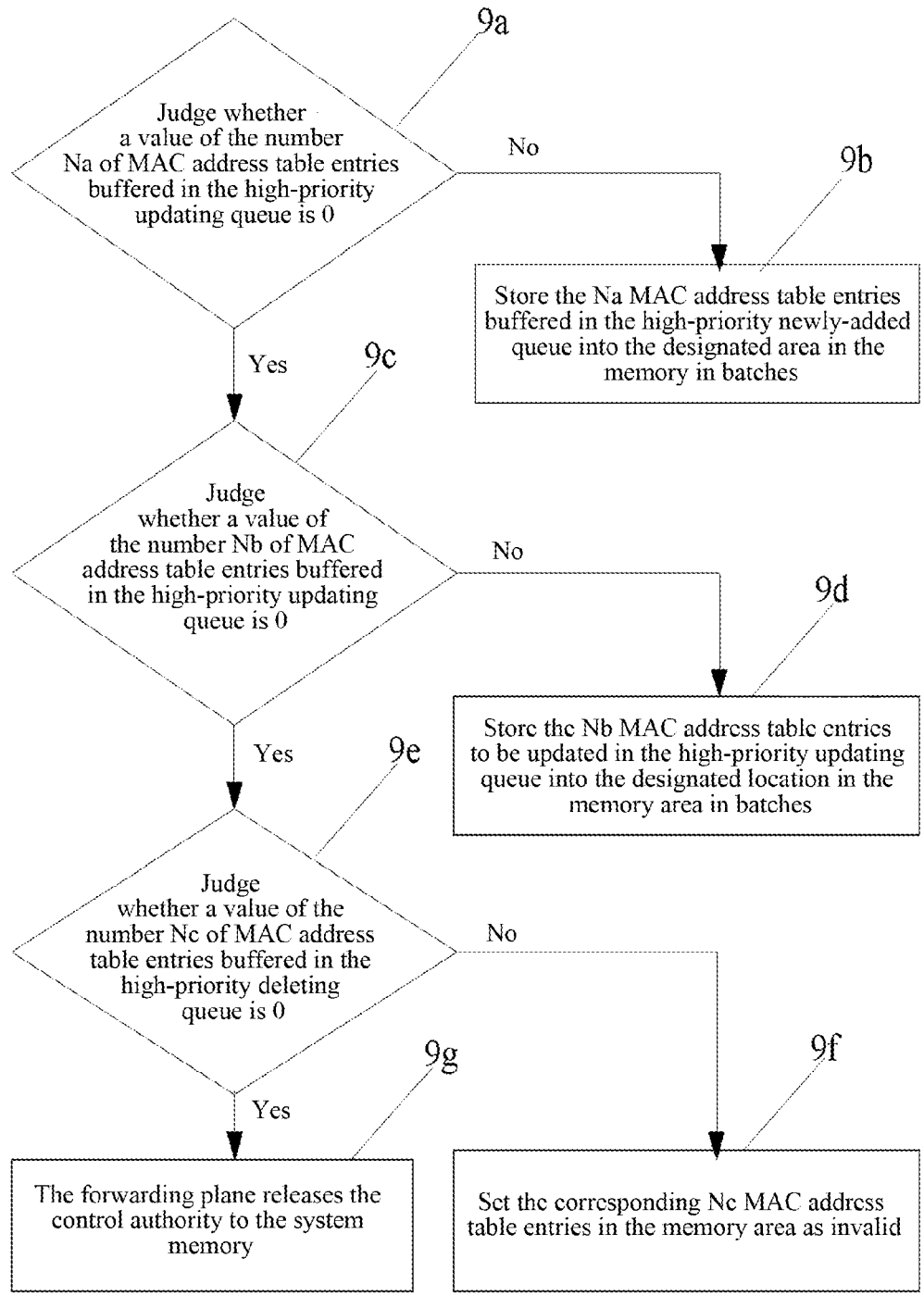
FIG. 9 is a flow chart of a method for synchronizing a changed MAC address table entry with subdivided queues in accordance with an embodiment of the present document.

The flow of a method for the forwarding plane synchronizing the changed MAC address table entries to be synchronized in the high-priority newly-added, updating and deleting queues into the designated locations in the memory area is shown in FIG. 9, and comprises:

In step 9a: it is judged whether a value of the number Na of MAC address table entries buffered in the high-priority newly-added queue is 0, and if determining that it is not 0, proceed to step 9*b*; otherwise, proceed to step 9*c*.

In step 9*b*: the Na MAC address table entries buffered in the high-priority newly-added queue are stored into the designated location in the memory area in batches, and the current processing procedure ends.

In step 9*c*: it is judged whether a value of the number Nb of MAC address table entries buffered in the high-priority updating queue is 0, and when determining that it is not 0, proceed to step 9*d*; otherwise, proceed to step 9*e*.

In step 9*d*: the Nb MAC address table entries to be updated in the high-priority updating queue are stored into the designated location in the memory area in batches, and the current processing procedure ends.

In step 9*e*: it is judged whether a value of the number Nc of MAC address table entries buffered in the high-priority deleting queue is 0, and when determining that it is not 0, proceed to step 9*f*; when determining that it is 0, proceed to step 9*g*.

In step 9*f*: the corresponding Nc MAC address table entries in the memory area is set as invalid, and the current processing procedure ends;

This step comprising: reserving resources of the Nc MAC address table entries and setting the Nc MAC address table entries as invalid; or deleting the resources of the Nc MAC address table entries if necessary.

In step 9*g*: the forwarding plane releases the control authority to the memory, and the current processing procedure ends.

In step 709: the forwarding plane releases the control authority to the memory, reverses the priorities of the high-priority newly-added, updating and deleting queues and the low-priority newly-added, updating and deleting queues, and proceed to step 703 of restarting the forwarding plane timer.

In step 710: the message of not supporting the function of rapidly synchronizing the MAC address is sent to the control plane.

In step 711: the current processing procedure ends.

Figure 10:
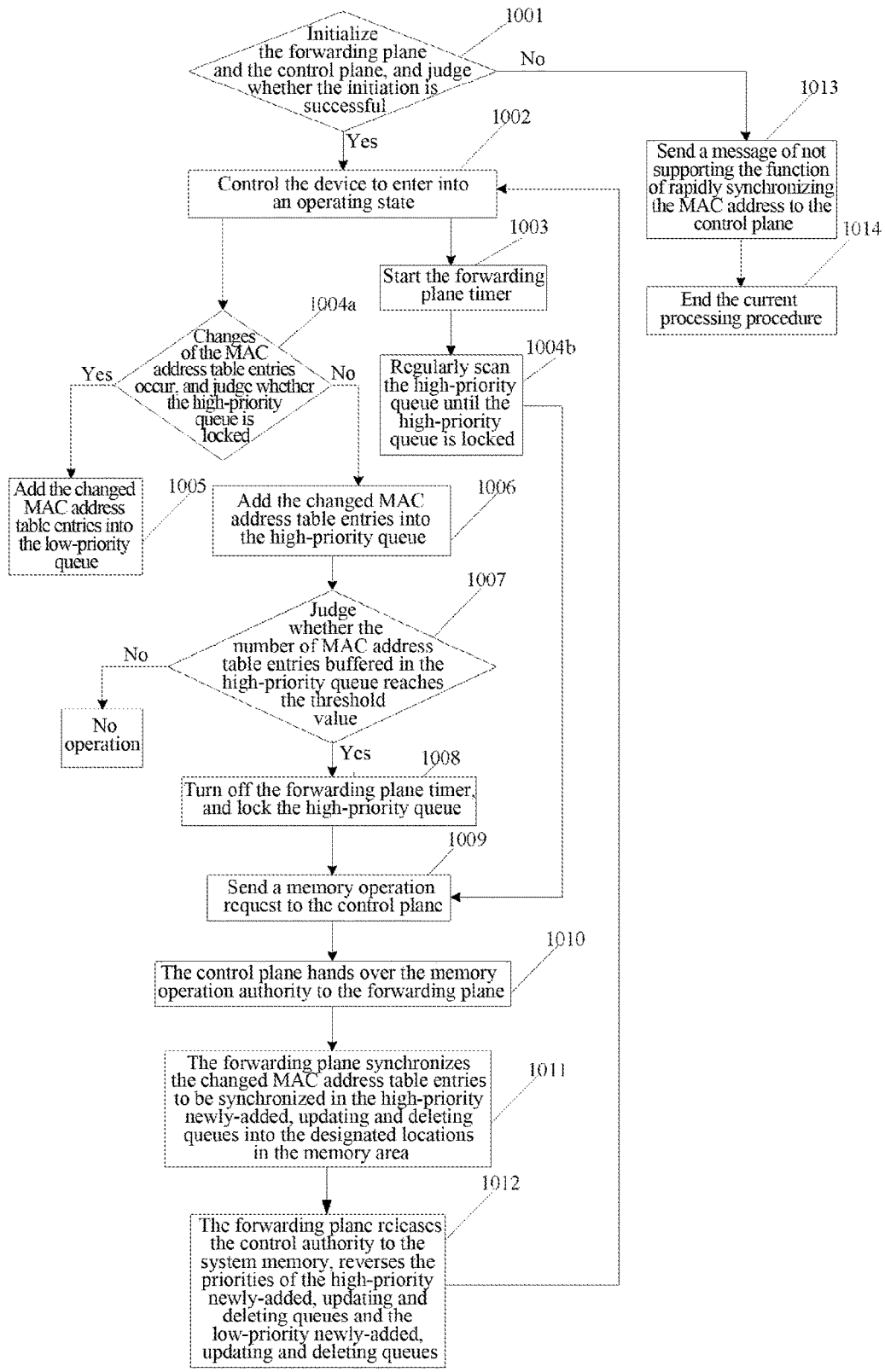
FIG. 10 is a flow chart of the method for rapidly synchronizing a MAC address table in accordance with a fifth embodiment of the present document.

FIG. 10 is a flow chart of a method for rapidly synchronizing a MAC address table in accordance with a fifth embodiment of the present document. As shown in FIG. 10, the flow of the method for rapidly synchronizing a MAC address table comprises:

In step 1001: the forwarding plane and the control plane are initialized, and it is judged whether the initiation is successful or not, and if it is successful, and if it is successful, proceed to step 1002; otherwise, proceed to step 1013.

Herein, the flow of the method for initializing the forwarding plane and the control plane is shown in FIG. 3, and comprises:

In step 3*a*: the control plane sends the MAC address software table configuration information to the forwarding plane.

Herein, the MAC address software table configuration information comprises: the address of the memory area M with specified size, the size N of the M, the timing parameter T, the buffer threshold value Th of each buffer queue, the length En of each buffer queue, the size L of each MAC address table entry, and the capacity En' of the system MAC address table, and other additional function information can be determined by negotiating between the control plane and the forwarding plane;

herein, the length of each buffer queue should be consistent with the capacity of the system MAC address table, and the range of the buffer threshold value Th of each buffer queue is 0 to En and is set by a person skilled in the art in terms of the CPU processing capability and the network environment.

Wherein, each MAC address table entry comprises at least: the MAC address, the PORT number, the VLAN identifier, and the valid/invalid state of the current MAC address table entry.

The buffer queue comprises the high-priority queue Fh and the low-priority queue Fl.

The initialization being successful represents that the forwarding plane timer, the high-priority queue Fh and the low-priority queue Fl have been ready, and the initialization being failed represents that the function of rapidly synchronizing MAC address is not supported.

In step 3*b*: the forwarding plane timer, the high-priority queue, the low-priority queue and the DMAC are initialized;

Herein, said initializing the forwarding plane timer, the high-priority queue, the low-priority queue and the DMAC comprises: the forwarding plane using the timing parameter T to initialize the forwarding plane timer, creating and initializing the high-priority queue Fh and the low-priority queue Fl, and writing data such as N, L, En and Th, etc., into the DMAC.

In step 3*c*: it is judged whether the initialization is successful, and if it is successful, proceed to step 3*d*; otherwise, proceed to step 3*e*.

In step 3*d*: an initialization success message is sent to the control plane, and the current processing procedure ends.

In step 3*e*: a message of not supporting the function of rapidly synchronizing the MAC address is sent to the control plane.

Said initializing the forwarding plane and the control plane may further comprise: the forwarding plane defining the MAC address software table configuration information, creating the high-priority queue and the low-priority queue, and initializing the forwarding plane timer, the high-priority queue, the low-priority queue and the DMAC; and the control plane reading the MAC address software table configuration information.

In step 1002: the device is controlled to enter into an operating state.

In step 1003: the forwarding plane timer is started.

Herein, it should be noted that the operations of controlling the device to enter into the operating state and starting the forwarding plane timer are operations executed at the same time.

In step 1004*a*: changes of MAC address table entries occur, it is judged whether the high-priority queue is locked, and proceed to step 1005 when determining that the high-priority queue is locked; when determining that the high-priority queue is not locked, add the changed MAC address table entries into the high-priority queue and proceed to step 1007.

Herein, the changed MAC address table entry comprise: a new MAC address table entry learned by the forwarding plane, a MAC address table entry that have been aged or drifted, and a MAC address table entry that needs to be added or deleted which is notified by the control plane and received by the forwarding plane.

In step 1004*b*: the high-priority queue is regularly scanned until the high-priority queue is locked, and proceed to step 1009.

Herein, the procedure of a method for regularly scanning the high-priority queue until the high-priority queue is locked is shown in FIG. 4 and comprises:

In step 4*a*: the forwarding plane timer waits.

In step 4b: it is judged whether the timer times out, and if determining that it times out, proceed to step 4c, otherwise, proceed to step 4a.

In step 4c: it is judged whether a MAC address table entry to be synchronized exists in the high-priority queue, and if determining that it exists, proceed to step 4d; if determining that it does not exist, proceed to step 4e.

Herein, said determining that a MAC address table entry to be synchronized exists in the high-priority queue comprises: determining that the MAC address table entry to be synchronized exists in at least one of the high-priority newly-added queue, the high-priority updating queue and the high-priority deleting queue;

said determining that no MAC address table entry to be synchronized exists in the high-priority queue comprises: determining that no MAC address table entry to be synchronized exists in all of the high-priority newly-added queue, the high-priority updating queue and the high-priority deleting queue.

In step 4d: the high-priority queue is locked, and the current processing procedure ends.

In step 4e: the forwarding plane timer is restarted, and then step 4a is executed.

Herein, it should be noted that there are no specific order for the operations of steps 1004a and 1004b, and they can be executed at the same time.

In step 1005: the changed MAC address table entries are added into the low-priority queue, and the current processing procedure ends;

herein, the low-priority queue comprises subdividing queues: a low-priority newly-added queue, a low-priority updating queue and a low-priority deleting queue.

In step 1006: the changed MAC address table entries are added into the high-priority queue;

the high-priority queue comprises subdividing queues: a high-priority newly-added queue, a high-priority updating queue and a high-priority deleting queue.

A flow of a method for judging whether the high-priority queue is locked, adding the changed MAC address table entries into the low-priority queue when determining that the high-priority queue is locked, and adding the changed MAC address table entries into the high-priority queue when determining that the high-priority queue is not locked, is shown in FIG. 8, and comprises:

In step 8a, it is judged whether the high-priority queue is locked, and proceed to step 8b if determining that it is not locked; and proceed to step 8g if determining that it is locked.

In step 8b: it is judged whether a changed MAC address table entry is a newly-added MAC address table entry, and when determining that it is the newly-added table entry, proceed to step 8c; otherwise, proceed to step 8d.

In step 8c: the newly-added MAC address table entry is added into the high-priority newly-added queue, and the current processing procedure ends.

In step 8d: it is judged whether the changed MAC address table entry is a MAC address table entry to be updated, and if it is the table entry to be updated, proceed to step 8e; otherwise, proceed to step 8f.

In step 8e: the MAC address table entry to be updated is add into the high-priority updating queue, and the current processing procedure ends.

In step 8f: the changed MAC address table entry is add into the high-priority deleting queue, and the current processing procedure ends.

In step 8g: it is judged whether a changed MAC address table entry is a newly-added MAC address table entry, and when determining that it is the newly-added table entry, proceed to step 8h; otherwise, proceed to step 8i.

In step 8h: the newly-added MAC address table entry is added into the low-priority newly-added queue, and the current processing procedure ends.

In step 8i: it is judged whether the changed MAC address table entry is a MAC address table entry to be updated, and if it is the table entry to be updated, proceed to step 8j; otherwise, proceed to step 8k.

In step 8j: the MAC address table entry to be updated is add into the low-priority updating queue, and the current processing procedure ends.

In step 8k: the changed MAC address table entry is add into the low-priority deleting queue, and the current processing procedure ends.

In step 1007: it is judged whether the number of MAC address table entries buffered in the high-priority queue reaches the threshold value, and when determining that the threshold value is reached, proceed to step 1008; otherwise, no operation is executed, and the current processing procedure ends.

Herein, said judging whether the number of the MAC address table entries buffered in the high-priority queue reaches the threshold value comprises: acquiring the sum Cn of the number Na of MAC address table entries buffered in the high-priority newly-added queue, the number Nb of MAC address table entries buffered in the high-priority updating queue, and the number Nc of MAC address table entries buffered in the high-priority deleting queue, and comparing the size of Cn and the preset threshold value Th, when Cn<Th, the threshold value is not reached; otherwise, the threshold value has been reached.

In step 1008: the forwarding plane timer is turned off, and the high-priority queue is locked.

In step 1009: a memory operation request is sent to the control plane.

In step 1010: the control plane hands over the memory operation authority to the forwarding plane.

Herein, the operation of the control plane handing over the memory operation authority to the forwarding plane is the existing technology, and will not be repeated here.

In step 1011: the forwarding plane synchronizes the changed MAC address table entries to be synchronized in the high-priority newly-added, updating and deleting queues into the designated locations in the memory area;

Herein, the HASH insertion algorithm of the MAC address table in the forwarding plane and the MAC address software table in the control plane needs to be consistent, so that the control plane can index the memory area M according to this HASH algorithm.

The flow of a method for the forwarding plane synchronizing the changed MAC address table entries to be synchronized in the high-priority newly-added, updating and deleting queues into the designated locations in the memory area is shown in FIG. 9, and comprises:

In step 9a: it is judged whether a value of the number Na of MAC address table entries buffered in the high-priority newly-added queue is 0, and if determining that it is not 0, proceed to step 9b; otherwise, proceed to step 9c.

In step 9b: the Na MAC address table entries buffered in the high-priority newly-added queue are stored into the designated location in the memory area in batches.

In step 9c: it is judged whether a value of the number Nb of MAC address table entries buffered in the high-priority updating queue is 0, and when determining that it is not 0, proceed to step 9d; otherwise, proceed to step 9e.

In step 9*d*: the Nb MAC address table entries to be updated in the high-priority updating queue are stored into the designated location in the memory area in batches.

In step 9*e*: it is judged whether a value of the number Nc of MAC address table entries buffered in the high-priority deleting queue is 0, and when determining that it is not 0, proceed to step 9*f*; when determining that it is 0, proceed to step 9*g*.

In step 9*f*: the corresponding Nc MAC address table entries in the memory area is set as invalid, and the current processing procedure ends;

This step comprising: reserving resources of the Nc MAC address table entries and setting the Nc MAC address table entries as invalid; or deleting the resources of the Nc MAC address table entries if necessary.

In step 9*g*: the forwarding plane releases the control authority to the memory.

In step 1012: the forwarding plane releases the control authority to the memory, reverses the priorities of the high-priority newly-added, updating and deleting queues and the low-priority newly-added, updating and deleting queues, and proceed to step 1003 of restarting the forwarding plane timer.

In step 1013: the message of not supporting the function of rapidly synchronizing the MAC address is sent to the control plane.

In step 1014: the current processing procedure ends.

Figure 11:
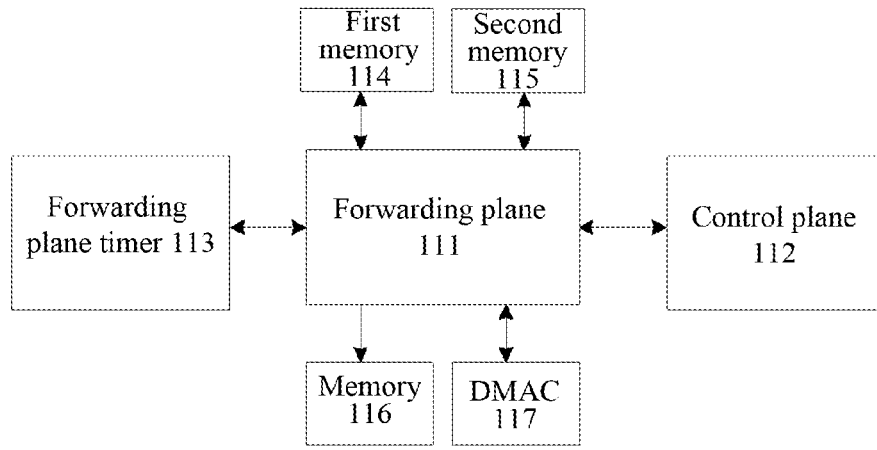
FIG. 11 is a schematic diagram of a structure of a device for rapidly synchronizing a MAC address table in the first and second embodiments of the present document.

FIG. 11 is a schematic diagram of a structure of a device for rapidly synchronizing a MAC address table in accordance with a first embodiment of the present document. As shown in FIG. 11, the device for rapidly synchronizing a MAC address table comprises: a forwarding plane 111, a control plane 112 and a forwarding plane timer 113; wherein, the forwarding plane 111 is configured to initialize the forwarding plane and the control plane and start the forwarding plane timer when determining that the initialization is successful; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the control plane 112 is configured to initialize the forwarding plane and the control plane, and hand the memory operation authority to the forwarding plane 111 when determining that the MAC address table synchronization condition is satisfied;

the forwarding plane timer 113 is configured to time and trigger an operation after a timeout at the time of timeout.

Herein, said initializing of the forwarding plane and the control plane comprises: the control plane 112 sending the MAC address software table configuration information to the forwarding plane 111; the forwarding plane 111 creating a high-priority queue and a low-priority queue according to the configuration information, and initializing the forwarding plane timer 113, the high-priority queue, the low-priority queue and a DMAC; or, the forwarding plane 111 defining the MAC address software table configuration information, creating a high-priority queue and a low-priority queue, and initializing the forwarding plane timer 113, the high-priority queue, the low-priority queue, and a DMAC, and the control plane 112 reading the MAC address software table configuration information.

The MAC address software table configuration information comprises: the address of the memory area M with specified size, the size N of the M, the timing parameter T, the length En of each buffer queue, the size L of each MAC address table entry and the capacity En' of the system MAC address table.

Herein, the buffer queue comprises: the high-priority queue and the low-priority queue.

Said each MAC address table entry comprises at least: the MAC address, the port number, the VLAN identifier, and the valid/invalid state of the current MAC address table entry.

Said initializing the forwarding plane time 113, the high-priority queue, the low-priority queue and the DMAC comprises: the forwarding plane using the timing parameter T to initialize the forwarding plane timer, creating and initializing the high-priority queue Fh and the low-priority queue Fl, and writing data such as N, L and En, etc., into the DMAC.

The MAC address table synchronization condition comprises: the forwarding plane timer times out and the high-priority queue is locked; or the number of MAC address table entries buffered in the high-priority queue is not lower than the buffer threshold value.

Said determining that the forwarding plane timer 113 times out and the high-priority queue is locked comprises: determining that the forwarding plane timer 113 times out, judging whether there is the MAC address table entry to be synchronized in the high-priority queue, and locking the high-priority queue when determining that there is the MAC address table entry to be synchronized.

The forwarding plane 111 acquiring the MAC address table entry to be synchronized and synchronizing the MAC address table entry to be synchronized into the designated location in the memory area according to the changed content comprises:

the forwarding plane 111 takes out a MAC address table entry to be processed from the high-priority queue in turn, judges whether it is a newly-added MAC address table entry, and if it is the newly-added table entry, writes the newly-added MAC address table entry into the designated location in the memory area, and sets the newly-added MAC address table entry as valid; if it is not the newly-added table entry, judges whether it is a MAC address table entry to be updated, and if it is the table entry to be updated, updates a MAC address table entry in the memory corresponding to the MAC address table entry to be updated, and sets the updated MAC address table entry as valid; and if it is not the table entry to be updated, it is a table entry to be deleted, then sets the MAC address table entry to be deleted as invalid; herein, said setting the MAC address table entry to be deleted as invalid comprises: reserving the MAC address table entry resources and setting the MAC address table entry as invalid; or, deleting the MAC address table entry resources if necessary.

In one embodiment, the forwarding plane 111 is configured to judge whether the high-priority queue is locked when a MAC address table entry is changed, add the changed MAC address table entry into the low-priority queue when determining that it is locked; when determining that it is unlocked, add the changed MAC address table entry into the high-priority queue.

In one embodiment, the forwarding plane 111 is configured to send a memory operation request to the control plane 112, release the control authority to the memory, and control the priority inversion of the high-priority queue and the low-priority queue.

In one embodiment, the device further comprises: a first memory 114, a second memory 115, a memory 116 and a DMAC 117; wherein, the first memory 114 is configured to store the high-priority queue;

the second memory 115 is configured to store the low-priority queue;

the memory 116 is configured to store the MAC address table;

the DMAC 117 is configured to store the size N of the memory 116, the capacity En' of the MAC address table entries in the memory 116, the size L, the address and the PORT number of each MAC address table entry, the VLAN identifier, the valid/invalid state, and the length En of the buffer queue, and other data.

A structure of a device for rapidly synchronizing a MAC address table in accordance with a second embodiment of the present document is shown in FIG. 11, wherein, the structure of the device for rapidly synchronizing a MAC address table comprises: a forwarding plane 111, a control plane 112 and a forwarding plane timer 113; wherein, the forwarding plane 111 is configured to initialize the forwarding plane and the control plane and start the forwarding plane timer when determining that the initialization is successful; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the control plane 112 is configured to initialize the forwarding plane and the control plane, and hand the memory operation authority to the forwarding plane 111 when determining that the MAC address table synchronization condition is satisfied;

the forwarding plane timer 113 is configured to time and trigger an operation after a timeout at the time of timeout.

Herein, said initializing of the forwarding plane and the control plane comprises: the control plane 112 sending the MAC address software table configuration information to the forwarding plane 111; the forwarding plane 111 creating a high-priority queue and a low-priority queue according to the configuration information, and initializing the forwarding plane timer 113, the high-priority queue, the low-priority queue and a DMAC; or, the forwarding plane 111 defining the MAC address software table configuration information, creating a high-priority queue and a low-priority queue, and initializing the forwarding plane timer 113, the high-priority queue, the low-priority queue, and a DMAC, and the control plane 112 reading the MAC address software table configuration information.

The MAC address software table configuration information comprises: the address of the memory area M with specified size, the size N of the M, the timing parameter T, the buffer threshold value Th of each buffer queue, the length En of each buffer queue, the size L of each MAC address table entry and the capacity En' of the system MAC address table.

The buffer queue comprises: the high-priority queue and the low-priority queue.

Said each MAC address table entry comprises at least: the MAC address, the port number, the VLAN identifier, and the valid/invalid state of the current MAC address table entry.

Said initializing the forwarding plane time 113, the high-priority queue, the low-priority queue and the DMAC comprises: the forwarding plane using the timing parameter T to initialize the forwarding plane timer 113, creating and initializing the high-priority queue Fh and the low-priority queue Fl, and writing data such as N, L and En, etc., into the DMAC.

The MAC address table synchronization condition comprises: the forwarding plane timer times out and the high-priority queue is locked; or the number of MAC address table entries buffered in the high-priority queue is not lower than the buffer threshold value.

Said determining that the forwarding plane timer 113 times out and the high-priority queue is locked comprises: determining that the forwarding plane timer 113 times out, judging whether there is the MAC address table entry to be synchronized in the high-priority queue, and locking the high-priority queue when determining that there is the MAC address table entry to be synchronized.

The forwarding plane 111 acquiring the MAC address table entry to be synchronized and synchronizing the MAC address table entry to be synchronized into the designated location in the memory area according to the changed content comprises:

the forwarding plane 111 takes out a MAC address table entry to be processed from the high-priority queue in turn, judges whether it is a newly-added MAC address table entry, and if it is the newly-added table entry, writes the newly-added MAC address table entry into the designated location in the memory area, and sets the newly-added MAC address table entry as valid; if it is not the newly-added table entry, judges whether it is a MAC address table entry to be updated, and if it is the table entry to be updated, updates a MAC address table entry in the memory corresponding to the MAC address table entry to be updated, and sets the updated MAC address table entry as valid; and if it is not the table entry to be updated, it is a table entry to be deleted, then sets the MAC address table entry to be deleted as invalid; herein, said setting the MAC address table entry to be deleted as invalid comprises: reserving the MAC address table entry resources and setting the MAC address table entry as invalid; or, deleting the MAC address table entry resources if necessary.

In one embodiment, the forwarding plane 111 is configured to judge whether the high-priority queue is locked when a MAC address table entry is changed, add the changed MAC address table entry into the low-priority queue when determining that it is locked; when determining that it is unlocked, add the changed MAC address table entry into the high-priority queue.

In one embodiment, the forwarding plane 111 is configured to send a memory operation request to the control plane 112, release the control authority to the memory, and control the priority inversion of the high-priority queue and the low-priority queue.

In one embodiment, the device further comprises: a first memory 114, a second memory 115, a memory 116 and a DMAC 117; wherein, the first memory 114 is configured to store the high-priority queue;

the second memory 115 is configured to store the low-priority queue;

the memory 116 is configured to store the MAC address table;

the DMAC 117 is configured to store the size N of the memory 116, the capacity En' of the MAC address table entries in the memory 116, the size L, the address and the PORT number of each MAC address table entry, the VLAN identifier, the valid/invalid state, and the length En of the buffer queue, and other data.

Figure 12:
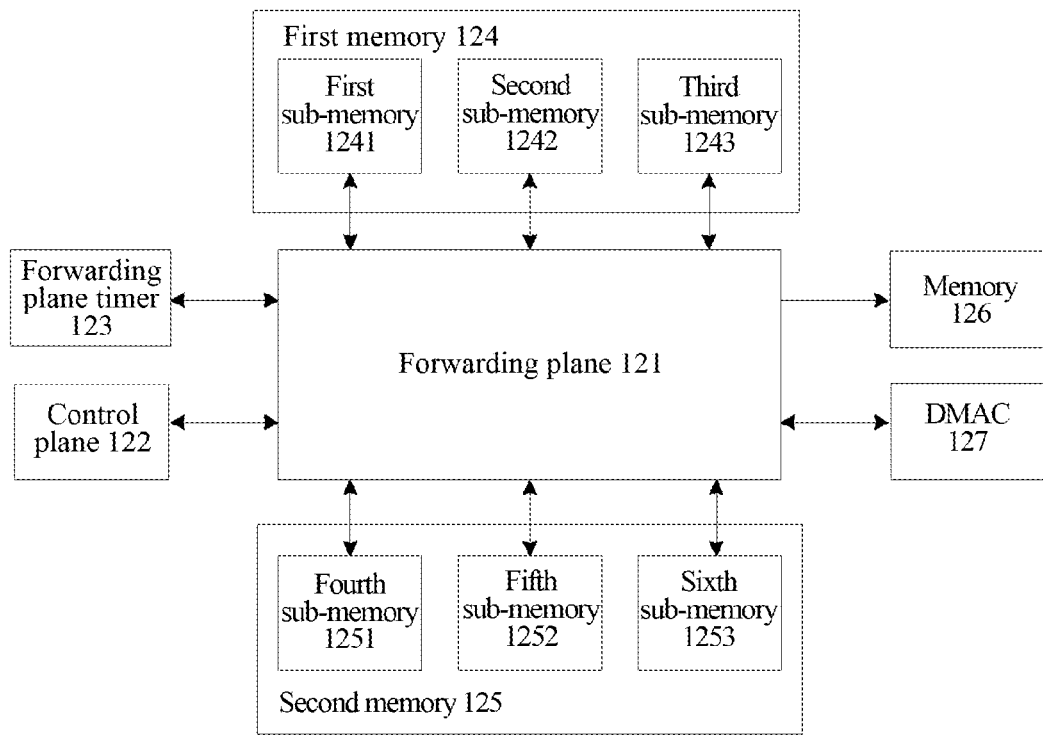
FIG. 12 is a schematic diagram of a structure of a device for rapidly synchronizing a MAC address table in the third and fourth embodiments of the present document.

FIG. 12 is a schematic diagram of a structure of a device for rapidly synchronizing a MAC address table in accordance with a third embodiment of the present document, and as shown in FIG. 12, the structure of the device for rapidly synchronizing the MAC address table comprises: a forwarding plane 121, a control plane 122, and a forwarding plane timer 123; wherein, the forwarding plane 121 is configured to initialize the forwarding plane and the control plane and start the forwarding plane timer when determining that the initialization is successful; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the control plane 122 is configured to initialize the forwarding plane and the control plane, and hand over the memory operation authority to the forwarding plane 121 when determining that the MAC address table synchronization condition is satisfied;

the forwarding plane timer 123 is configured to time and trigger a post-timeout operation upon a timeout.

Herein, said initializing the forwarding plane and the control plane comprises: the control plane 122 sending the MAC address software table configuration information to the forwarding plane 121; the forwarding plane 121 creating the high-priority queue and the low-priority queue based on the configuration information, and initializing the forwarding plane timer 123, the high-priority queue, the low-priority queue and the DMAC;

alternatively, the forwarding plane 121 defining the MAC address software table configuration information, creating the high-priority queue and the low-priority queue, and initializing the forwarding plane timer 123, the high-priority queue, the low-priority queue, and the direct memory access controller (DMAC), and the control plane 122 reading the MAC address software table configuration information.

The MAC address software table configuration information comprises: the address of the memory area M with specified size, the size N of the M, the timing parameter T, the length En of each buffer queue, the size L of each MAC address table entry and the capacity En' of the system MAC address table.

Herein, the buffer queue comprises: the high-priority queue and the low-priority queue;

the high-priority queue comprises: a high-priority newly-added queue, a high-priority updating queue and a high-priority deleting queue;

the low-priority queue comprises: a low-priority newly-added queue, a low-priority updating queue and a low-priority deleting queue.

Said each MAC address table entry comprises at least: the MAC address, the port number, the VLAN identifier, and the valid/invalid state of the current MAC address table entry.

said initializing the forwarding plane time 123, the high-priority queue, the low-priority queue and the DMAC comprises: the forwarding plane using the timing parameter T to initialize the forwarding plane timer, creating and initializing the high-priority queue Fh and the low-priority queue Fl, and writing data such as N, L and En, etc., into the DMAC.

The MAC address table synchronization condition comprises: the forwarding plane timer times out and the high-priority queue is locked; or the number of MAC address table entries buffered in the high-priority queue is not lower than the buffer threshold value.

Said determining that the forwarding plane timer 123 times out and the high-priority queue is locked comprises:

determining that the forwarding plane timer times out, judging whether there is the MAC address table entry to be synchronized in the high-priority queue, and locking the high-priority queue when determining that there is the MAC address table entry to be synchronized.

The forwarding plane 121 acquiring the MAC address table entry to be synchronized comprises: the forwarding plane 121 acquiring the MAC address table entry to be synchronized from the high-priority queue of the forwarding plane.

Said taking out the MAC address table entry to be synchronized from the high-priority queue, and synchronizing the MAC address table entry to be synchronized into the designated location in the memory area according to the changed content comprises:

the forwarding plane 121 judging whether a value of the number Na of the MAC address table entries buffered in the high-priority newly-added queue is 0, if the value of Na is not 0, storing the Na MAC address table entries buffered in the high-priority newly-added queue into the designated location in the memory area in batches; if the value of Na is 0, judging whether a value of the number Nb of the MAC address table entries buffered in the high-priority updating queue is 0, and if the value of Nb is not 0, storing the Nb MAC address table entries to be updated in the high-priority updating queue into the designated location in the memory area in batches; if the value of Nb is 0, judging whether a value of the number Nc of the MAC address table entries buffered in the high-priority deleting queue is 0, and if the value of Nc is not 0, setting the Nc MAC address table entries buffered in the high-priority deleting queue as invalid; herein, said setting the Nc MAC address table entries buffered in the high-priority queue as invalid comprises: reserving the resources of the Nc MAC address table entries and setting the Nc MAC address table entries as invalid; or, deleting the resources the MAC address table entries if necessary.

In one embodiment, the forwarding plane 121 is configured to judge whether the high-priority queue is locked when there are MAC address table entries changed, when determining that the high-priority queue is locked, judge whether the changed MAC address table entry is a newly-added MAC address table entry, if it is the newly-added table entry, add the newly-added MAC address table entry into the low-priority newly-added queue; if it is not the newly-added table entry, judge whether the changed MAC address table entry is a MAC address table entry to be updated or not, if it is the table entry to be updated, add the MAC address table entry to be updated into the low-priority updating queue; and if it is not the table entry to be updated, add the changed MAC address table entry into the low-priority deleting queue;

judge whether the changed MAC address table entry is newly-added MAC address table entry when determining that the high-priority queue is not locked, if it is the newly-added table entry, add the newly-added MAC address table entry into the high-priority newly-added queue; if it is not the newly-added table entry, judge whether the changed MAC address table entry is a MAC address table entry to be updated or not, if it is the table entry to be updated, add the MAC address table entry to be updated into the high-priority updating queue; and if it is not the table entry to be updated, add the changed MAC address table entry into the high-priority deleting queue.

In one embodiment, the forwarding plane 121 is configured to send a memory operation request to the control plane 122, release the control authority to the memory, and control the priority inversion of the high-priority newly-added, updating and deleting queues and the low-priority newly-added, updating and deleting queues.

In one embodiment, the device further comprises: a first memory 124, a second memory 125, a memory 126 and a DMAC 127; wherein the first memory 124 is configured to store the high-priority queue;

the second memory 125 is configured to store the low-priority queue;

the memory 126 is configured to store the MAC address table;

the DMAC 127 is configured to store the size N of the memory 126, the capacity En' of the MAC address table entry in the memory 126, the size L, the address and the PORT number of each MAC address table entry, the VLAN identifier, the valid/invalid state, and the lengths En of the high-priority queue and the low-priority queue, and other data.

In one embodiment, the first memory 124 comprises: a first sub-memory 1241, a second sub-memory 1242 and a third sub-memory 1243;

the second memory 125 comprises: a fourth sub-memory 1251, a fifth sub-memory 1252 and a sixth sub-memory 1253;

wherein, the first sub-memory 1241 is configured to store a high-priority newly-added queue;

the second sub-memory 1242 is configured to store a high-priority updating queue;

the third sub-memory 1243 is configured to store a high-priority deleting queue;

the fourth sub-memory 1251 is configured to store a low-priority newly-added queue;

the fifth sub-memory 1252 is configured to store a low-priority updating queue;

the sixth sub memory 1253 is configured to store a low-priority deleting queue.

A structure of a device for rapidly synchronizing a MAC address table in accordance with the fourth embodiment of the present document is shown in FIG. 12, and the structure of the device for rapidly synchronizing the MAC address table comprises: a forwarding plane 121, a control plane 122, and a forwarding plane timer 123; wherein, the forwarding plane 121 is configured to initialize the forwarding plane and the control plane and start the forwarding plane timer when determining that the initialization is successful; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the control plane 122 is configured to initialize the forwarding plane and the control plane, and hand over the memory operation authority to the forwarding plane 121 when determining that the MAC address table synchronization condition is satisfied;

the forwarding plane timer 123 is configured to time and trigger a post-timeout operation upon a timeout.

Herein, said initializing the forwarding plane and the control plane comprises: the control plane 122 sending the MAC address software table configuration information to the forwarding plane 121; the forwarding plane 121 creating the high-priority queue and the low-priority queue based on the configuration information, and initializing the forwarding plane timer 123, the high-priority queue, the low-priority queue and the DMAC; or the forwarding plane 121 defining the MAC address software table configuration information, creating the high-priority queue and the low-priority queue, and initializing the forwarding plane timer 123, the high-priority queue, the low-priority queue, and the direct memory access controller (DMAC), and the control plane 122 reading the MAC address software table configuration information.

The MAC address software table configuration information comprises: the address of the memory area M with specified size, the size N of the M, the timing parameter T, the buffer threshold value Th of each buffer queue, the length En of each buffer queue, the size L of each MAC address table entry and the capacity En' of the system MAC address table.

Herein, the buffer queue comprises: the high-priority queue and the low-priority queue;

the high-priority queue comprises: a high-priority newly-added queue, a high-priority updating queue and a high-priority deleting queue;

the low-priority queue comprises: a low-priority newly-added queue, a low-priority updating queue and a low-priority deleting queue.

Said each MAC address table entry comprises at least: the MAC address, the port number, the VLAN identifier, and the valid/invalid state of the current MAC address table entry.

said initializing the forwarding plane time 123, the high-priority queue, the low-priority queue and the DMAC comprises: the forwarding plane using the timing parameter T to initialize the forwarding plane timer 123, creating and initializing the high-priority queue Fh and the low-priority queue Fl, and writing data such as N, L and En, etc., into the DMAC.

The MAC address table synchronization condition comprises: the forwarding plane timer times out and the high-priority queue is locked; or the number of MAC address table entries buffered in the high-priority queue is not lower than the buffer threshold value.

Said determining that the forwarding plane timer 123 times out and the high-priority queue is locked comprises:

determining that the forwarding plane timer times out, judging whether there is the MAC address table entry to be synchronized in the high-priority queue, and locking the high-priority queue when determining that there is the MAC address table entry to be synchronized.

Said acquiring the MAC address table entry to be synchronized, and synchronizing the MAC address table entry to be synchronized into the designated location in the memory area according to the changed content of the MAC address table entry to be synchronized comprises:

judging whether a value of the number Na of the MAC address table entries buffered in the high-priority newly-added queue is 0, if the value of Na is not 0, storing the Na MAC address table entries buffered in the high-priority newly-added queue into the designated location in the memory area in batches; if the value of Na is 0, judging whether a value of the number Nb of the MAC address table entries buffered in the high-priority updating queue is 0, and if the value of Nb is not 0, storing the Nb MAC address table entries to be updated in the high-priority updating queue into the designated location in the memory area in batches; if the value of Nb is 0, judging whether a value of the number Nc of the MAC address table entries buffered in the high-priority deleting queue is 0, and if the value of Nc is not 0, setting the Nc MAC address table entries buffered in the high-priority deleting queue as invalid; herein, said setting the Nc MAC address table entries buffered in the high-priority queue as invalid comprises: reserving the resources of the Nc MAC address table entries and setting the Nc MAC address table entries as invalid; or, deleting the resources the MAC address table entries if necessary.

In one embodiment, the forwarding plane 121 is configured to judge whether the high-priority queue is locked when there are MAC address table entries changed, when determining that the high-priority queue is locked, judge whether the changed MAC address table entry is a newly-added MAC address table entry, if it is the newly-added table entry, add the newly-added MAC address table entry into the low-priority newly-added queue; if it is not the newly-added table entry, judge whether the changed MAC address table entry is a MAC address table entry to be updated or not, if it is the table entry to be updated, add the MAC address table entry to be updated into the low-priority updating queue; and if it is not the table entry to be updated, add the changed MAC address table entry into the low-priority deleting queue;

judge whether the changed MAC address table entry is newly-added MAC address table entry when determining that the high-priority queue is not locked, if it is the newly-added table entry, add the newly-added MAC address table entry into the high-priority newly-added queue; if it is not the newly-added table entry, judge whether the changed MAC address table entry is a MAC address table entry to be updated or not, if it is the table entry to be updated, add the MAC address table entry to be updated into the high-priority updating queue; and if it is not the table entry to be updated, add the changed MAC address table entry into the high-priority deleting queue.

In one embodiment, the forwarding plane 121 is configured to send a memory operation request to the control plane 122, release the control authority to the memory, and control the priority inversion of the high-priority newly-added, updating and deleting queues and the low-priority newly-added, updating and deleting queues.

In one embodiment, the device further comprises: a first memory 124, a second memory 125, a memory 126 and a DMAC 127; wherein the first memory 124 is configured to store the high-priority queue;

the second memory 125 is configured to store the low-priority queue;

the memory 126 is configured to store the MAC address table;

the DMAC 127 is configured to store the size N of the memory 126, the capacity En' of the MAC address table entry in the memory 126, the size L, the address and the PORT number of each MAC address table entry, the VLAN identifier, the valid/invalid state, and the lengths En of the high-priority queue and the low-priority queue, and other data.

In one embodiment, the first memory 124 comprises: a first sub-memory 1241, a second sub-memory 1242 and a third sub-memory 1243;

the second memory 125 comprises: a fourth sub-memory 1251, a fifth sub-memory 1252 and a sixth sub-memory 1253;

wherein, the first sub-memory 1241 is configured to store a high-priority newly-added queue;

the second sub-memory 1242 is configured to store a high-priority updating queue;

the third sub-memory 1243 is configured to store a high-priority deleting queue;

the fourth sub-memory 1251 is configured to store a low-priority newly-added queue;

the fifth sub-memory 1252 is configured to store a low-priority updating queue;

the sixth sub memory 1253 is configured to store a low-priority deleting queue.

The first memory, the second memory, the memory and the DMAC in the device for rapidly synchronizing a MAC address table provided in the embodiment of the present document can be realized by a storage device such as a hard disk and so on; the forwarding plane and the control plane can be realized by a processor, or realized by specific logic circuits of course; wherein, the processor may be a mobile terminal or a processor on a server, in practical applications, the processor may be a central processing unit (CPU), a microprocessor (MPU), a digital signal processor (DSP) or a field programmable gate array (FPGA), etc.

In the embodiment of the present document, when the abovementioned method for rapidly synchronizing the MAC address table is realized in the form of a software function module and is sold or used as a standalone product, it can be stored in a computer-readable storage medium also. Based on this understanding, the technical solution of the embodiments of the present document, in essence or in the part contributed to the prior art, can be embodied in the form of a software product, and the computer software product can be stored in a storage medium and comprises several instructions, so that a computer device (which may be a personal computer, a server, or a network device, etc.) executes all or part of the method described in the various embodiments of the present document. The abovementioned storage medium comprises: a USB disk, a removable hard disk, a read only memory (ROM), a magnetic disk, an optical disk, or various types of mediums that can store program codes. Thus, the embodiments of the present document are not limited to any particular combination of hardware and software.

Accordingly, the embodiment of the present document further provides a computer storage medium in which stores a computer program for executing the abovementioned method for rapidly synchronizing the MAC address table in accordance with the embodiments of the present document.

The above description are only preferred embodiments of the present document and is not intended to limit the protection scope of the present document.

What is claimed:

1. A method for rapidly synchronizing a media access control (MAC) address table, comprising:

initializing a forwarding plane and a control plane, and starting a forwarding plane timer when determining that the forwarding plane and the control plane are successfully initialized;

the forwarding plane acquiring a memory operation authority when determining that a MAC address table synchronization condition is satisfied;

acquiring a MAC address table entry to be synchronized, and synchronizing the MAC address table entry to be synchronized into a designated location in a memory area according to changed content of the MAC address table entry to be synchronized;

wherein, said initializing the forwarding plane and the control plane comprises: the control plane sending MAC address software table configuration information to the forwarding plane; the forwarding plane creating a high-priority queue and a low-priority queue according to the configuration information, and initializing the forwarding plane timer, the high-priority queue, the low-priority queue, and a direct memory access controller (DMAC);

or, the forwarding plane defining MAC address software table configuration information, creating a high-priority queue and a low-priority queue according to the configuration information, and initializing the forwarding plane timer, the high-priority queue, the low-priority queue and a Direct Memory Access Controller (DMAC), and the control plane reading the MAC address software table configuration information.

2. A computer storage medium, wherein, the computer storage medium stores computer executable instructions, and the computer executable instructions are used for executing the method for rapidly synchronizing a MAC address table of claim 1.

3. A device for rapidly synchronizing a MAC address table, comprising: a forwarding plane and a control plane, and the forwarding plane comprising a forwarding plane timer; wherein, the forwarding plane is configured to initialize the forwarding plane and the control plane and start the forwarding plane timer when determining that the forwarding plane and the control plane are initialized successfully; when determining that a MAC address table synchronization condition is satisfied, acquire a memory operation authority; acquire a MAC address table entry to be synchronized, and synchronize the MAC address table entry to be synchronized into a designated location in a memory area according to changed content of the MAC address table entry to be synchronized;

the forwarding plane timer is configured to time and trigger an operation after a timeout at the time of timeout;

the control plane is configured to initialize the forwarding plane and the control plane, and hand the memory operation authority to the forwarding plane when determining that the MAC address table synchronization condition is satisfied.

4. The device of claim 3, wherein, the initialization of the forwarding plane and the control plane comprises: the control plane sending MAC address software table configuration information to the forwarding plane; the forwarding plane creating a high-priority queue and a low-priority queue according to the configuration information, and initializing the forwarding plane timer, the high-priority queue, the low-priority queue and a DMAC;

or, the forwarding plane defining MAC address software table configuration information, creating a high-priority queue and a low-priority queue, and initializing the forwarding plane timer, the high-priority queue, the low-priority queue, and a direct memory access controller (DMAC), and the control plane reading the MAC address software table configuration information.

5. The device of claim 4, wherein, the MAC address table synchronization condition comprises: determining that the forwarding plane timer times out and the high-priority queue is locked; or determining that the number of MAC address table entries buffered in the high-priority queue is not lower than a buffer threshold value.

6. The device of claim 5, wherein, said determining that the forwarding plane timer times out and the high-priority queue is locked comprises:

determining that the forwarding plane timer times out, judging whether there is the MAC address table entry to be synchronized in the high-priority queue, and locking the high-priority queue when determining that there is the MAC address table entry to be synchronized.

7. The device of claim 5, wherein, said determining that the number of the MAC address table entries buffered in the high-priority queue is not lower than the buffer threshold value comprises: acquiring a sum Cn of the number Na of MAC address table entries buffered in the high-priority newly-added queue, the number Nb of MAC address table entries buffered in the high-priority updating queue, and the number Nc of MAC address table entries buffered in the high-priority deleting queue, and comparing the size of Cn and the preset threshold value Th, when Cn<Th, the threshold value is not reached; otherwise, the threshold value has been reached.

8. The device of claim 4, wherein, the device further comprises: a first memory and a second memory; wherein the first memory is configured to store the high-priority queue;

the second memory is configured to store the low-priority queue;

wherein, the first memory comprises: a first sub-memory, a second sub-memory and a third sub-memory; the second memory comprises: a fourth sub-memory, a fifth sub-memory and a sixth sub-memory; and wherein, the first sub-memory is configured to store a high-priority newly-added queue; the second sub-memory is configured to store a high-priority updating queue; the third sub-memory is configured to store a high-priority deleting queue; the fourth sub-memory is configured to store a low-priority newly-added queue; the fifth sub-memory is configured to store a low-priority updating queue; the sixth sub memory is configured to store a low-priority deleting queue.

9. The device of claim 4, wherein, the forwarding plane is configured to, when a MAC address table entry is changed, judge whether the high-priority queue is locked, add the changed MAC address table entry into the low-priority queue when determining that the high-priority queue is locked; and add the changed MAC address table entry into the high-priority queue when determining that the high-priority queue is not locked; and release a control authority to the memory, control a priority reversion of the high-priority queue and the low-priority queue, and restart the forwarding plane timer.

10. The device of claim 9, wherein, the forwarding plane is configured to: judge whether the high-priority queue is locked, and when determining that the high-priority queue is locked, judge whether the changed MAC address table entry is a newly-added MAC address table entry or not, if it is the newly-added table entry, add the newly-added MAC address table entry into the low-priority newly-added queue; if it is not the newly-added table entry, judge whether the changed MAC address table entry is a MAC address table entry to be updated or not, if it is the table entry to be updated, add the MAC address table entry to be updated into the low-priority updating queue; and if it is not the table entry to be updated, add the changed MAC address table entry into the low-priority deleting queue;

when determining that the high-priority queue is not locked, judge whether the changed MAC address table entry is a newly-added MAC address table entry or not, if it is the newly-added table entry, add the newly-added MAC address table entry into the high-priority newly-added queue; if it is not the newly-added table entry, judge whether the changed MAC address table entry is a MAC address table entry to be updated or not, if it is the table entry to be updated, add the MAC address table entry to be updated into the high-priority updating queue; and if it is not the table entry to be updated, add the changed MAC address table entry into the high-priority deleting queue.

11. The device of claim 4, wherein, the MAC address software table configuration information comprises:
an address of a memory area M with specified size, a size N of M, a timing parameter T, a length En of each buffer queue, a size L of each MAC address table entry and a capacity En' of the system MAC address table;
or, an address of a memory area M with specified size, a size N of M, a timing parameter T, a buffer threshold value Th of each buffer queue, a length En of each buffer queue, a size L of each MAC address table entry, and a capacity En' of the system MAC address table;
wherein, N=L*En, and En=En'.

12. The device of claim 4, wherein, the forwarding plane is configured to: take out a MAC address table entry to be processed from the high-priority queue in turn, judge whether it is a newly-added MAC address table entry, and if it is the newly-added table entry, write the newly-added MAC address table entry into the designated location in the memory area, and set the newly-added MAC address table entry as valid; if it is not the newly-added table entry, judge whether it is a MAC address table entry to be updated, and if it is the table entry to be updated, update a MAC address table entry in the memory corresponding to the MAC address table entry to be updated, and set the updated MAC address table entry as valid; and if it is not the table entry to be updated, set the MAC address table entry to be processed as invalid.

13. The method of claim 1, wherein, the MAC address software table configuration information comprises:
an address of a memory area M with specified size, a size N of the memory area M, a timing parameter T, a length En of each buffer queue, a size L of each MAC address table entry and a capacity En' of the system MAC address table;
or, an address of a memory area M with specified size, a size N of the memory area M, a timing parameter T, a buffer threshold value Th of each buffer queue, a length En of each buffer queue, a size L of each MAC address table entry, and a capacity En' of the system MAC address table;
wherein, N=L*En, and En=En'.

14. The method of claim 1, wherein, the MAC address table synchronization condition comprises: determining that the forwarding plane timer is overtime and the high-priority queue is locked; or determining that the number of MAC address table entries buffered in the high-priority queue is not lower than a buffer threshold value.

15. The method of claim 14, wherein, before determining that the MAC address table synchronization condition is satisfied, the method further comprises:
when a MAC address table entry is changed, judging whether the high-priority queue is locked, and when determining that the high-priority queue is locked, adding the changed MAC address table entry into the low-priority queue; when determining that the high-priority queue is not locked, adding the changed MAC address table entry into the high-priority queue.

16. The method of claim 15, wherein, said judging whether the high-priority queue is locked, adding the changed MAC address table entry into the low-priority queue when determining that the high-priority queue is locked; and adding the changed MAC address table entry into the high-priority queue when determining that the high-priority queue is not locked comprises:
judging whether the high-priority queue is locked, and when determining that the high-priority queue is locked, judging whether the changed MAC address table entry is a newly-added MAC address table entry or not, if it is the newly-added table entry, adding the newly-added MAC address table entry into the low-priority newly-added queue; if it is not the newly-added table entry, judging whether the changed MAC address table entry is a MAC address table entry to be updated or not, if it is the table entry to be updated, adding the MAC address table entry to be updated into the low-priority updating queue; and if it is not the table entry to be updated, adding the changed MAC address table entry into the low-priority deleting queue;
when determining that the high-priority queue is not locked, judging whether the changed MAC address table entry is a newly-added MAC address table entry or not, if it is the newly-added table entry, adding the newly-added MAC address table entry into the high-priority newly-added queue; if it is not the newly-added table entry, judging whether the changed MAC address table entry is a MAC address table entry to be updated or not, if it is the table entry to be updated, adding the MAC address table entry to be updated into the high-priority updating queue; and if it is not the table entry to be updated, adding the changed MAC address table entry into the high-priority deleting queue.

17. The method of claim 14, wherein, said determining that the forwarding plane timer is overtime and the high-priority queue is locked comprises:
determining that the forwarding plane timer is overtime, judging whether there is the MAC address table entry to be synchronized in the high-priority queue, and locking the high-priority queue when determining that there is the MAC address table entry to be synchronized.

18. The method of claim 14, wherein, the high-priority queue comprises: a high-priority newly-added queue, a high-priority updating queue and a high-priority deleting queue;
the low-priority queue comprises: a low-priority newly-added queue, a low-priority updating queue and a low-priority deleting queue;
wherein, said determining that the number of the MAC address table entries buffered in the high-priority queue is not lower than the buffer threshold value comprises:
acquiring a sum Cn of the number Na of MAC address table entries buffered in the high-priority newly-added queue, the number Nb of MAC address table entries buffered in the high-priority updating queue, and the number Nc of MAC address table entries buffered in the high-priority deleting queue, and comparing the size of Cn with the preset threshold value Th, when Cn<Th, the threshold value is not reached; otherwise, the threshold value has been reached; and
wherein, said acquiring the MAC address table entry to be synchronized, and synchronizing the MAC address table entry to be synchronized into the designated location in the memory area according to the changed content of the MAC address table entry to be synchronized comprises:

judging whether a value of the number Na of the MAC address table entries buffered in the high-priority newly-added queue is 0 or not, if the value of Na is not 0, storing the Na MAC address table entries buffered in the high-priority newly-added queue into the designated location in the memory area in batches; if the value of Na is 0, judging whether a value of the number Nb of the MAC address table entries buffered in the high-priority updating queue is 0 or not, and if the value of Nb is not 0, storing the Nb MAC address table entries to be updated in the high-priority updating queue into the designated location in the memory area in batches; if the value of Nb is 0, judging whether a value of the number Nc of the MAC address table entries buffered in the high-priority deleting queue is 0 or not, and if the value of Nc is not 0, setting the Nc MAC address table entries buffered in the high-priority deleting queue as invalid.

19. The method of claim 1, wherein, said acquiring the MAC address table entry to be synchronized, and synchronizing the MAC address table entry to be synchronized into the designated location in the memory area according to the changed content of the MAC address table entry to be synchronized comprise:

taking out a MAC address table entry to be processed from the high-priority queue in turn, judging whether it is a newly-added MAC address table entry, and if it is the newly-added MAC address table entry, writing the newly-added MAC address table entry into the designated location in the memory area, and setting the newly-added MAC address table entry as valid; if it is not the newly-added table entry, judging whether it is a MAC address table entry to be updated, and if it is the table entry to be updated, updating a MAC address table entry in the memory corresponding to the MAC address table entry to be updated, and setting the updated MAC address table entry as valid; and if it is not the table entry to be updated, setting the MAC address table entry to be processed as invalid.

20. The method of claim 1, wherein, after synchronizing the MAC address table entry to be synchronized into the designated location in the memory area according to the changed content of the MAC address table entry to be synchronized, the method further comprises:

the forwarding plane releasing a control authority to the memory, reversing the priorities of the high-priority queue and the low-priority queue, and restarting the forwarding plane timer.

21. The device of claim 4, wherein, the forwarding plane is configured to: judge whether a value of the number Na of MAC address table entries buffered in the high-priority newly-added queue is 0 or not, and if the value of Na is not 0, store the Na MAC address table entries buffered in the high-priority newly-added queue into the designated location in the memory area in batches; if the value of Na is 0, judge whether a value of the number Nb of the MAC address table entries buffered in the high-priority updating queue is 0 or not, and if the value of Nb is not 0, store the Nb MAC address table entries to be updated in the high-priority updating queue into the designated location in the memory area in batches; if the value of Nb is 0, judge whether a value of the number Nc of MAC address table entries buffered in the high-priority deleting queue is 0 or not, and if the value of Nc is not 0, set the Nc MAC address table entries buffered in the high-priority deleting queue as invalid.

\* \* \* \* \*